(12) United States Patent  
Vaccari et al.

(10) Patent No.: US 11,413,549 B2  
(45) Date of Patent: *Aug. 16, 2022

(54) GAMEPLAY THREADS IN MESSAGING APPLICATIONS

(71) Applicant: Meta Platforms, Inc., Menlo Park, CA (US)

(72) Inventors: Andrea Vaccari, San Francisco, CA (US); Pooya Karimian, Redwood City, CA (US); Lei Guang, Redwood City, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/097,575

(22) Filed: Nov. 13, 2020

(65) Prior Publication Data

US 2021/0060446 A1 Mar. 4, 2021

Related U.S. Application Data

(63) Continuation of application No. 15/783,905, filed on Oct. 13, 2017, now Pat. No. 10,874,950.

(Continued)

(51) Int. Cl.
*A63F 13/00* (2014.01)
*A63F 13/87* (2014.01)
(Continued)

(52) U.S. Cl.
CPC ............. *A63F 13/87* (2014.09); *A63F 13/30* (2014.09); *A63F 13/35* (2014.09); *A63F 13/79* (2014.09);

(Continued)

(58) Field of Classification Search
CPC ...... A63F 13/355; A63F 13/335; A63F 13/85; A63F 13/35; A63F 13/795; A63F 13/216; A63F 13/00; A63F 13/30; A63F 13/352
See application file for complete search history.

(56) References Cited

U.S. PATENT DOCUMENTS

2016/0171827 A1* 6/2016 Washington .......... A63F 13/822  
463/22  
2016/0171835 A1* 6/2016 Washington ........ G07F 17/3244  
463/25

(Continued)

OTHER PUBLICATIONS

Co-Pending U.S. Appl. No. 15/783,905, filed Oct. 13, 2017, 85 Pages.

*Primary Examiner* — Omkar A Deodhar  
*Assistant Examiner* — Eric M Thomas  
(74) *Attorney, Agent, or Firm* — Baker Botts L.L.P.

(57) ABSTRACT

In one embodiment, a method includes receiving, at a first client system of a first user, a first notification that a second user has performed a first in-game action in a game session of a game; displaying, at the first client system, a game window associated with the game within a message thread on a messaging application running on the first client system, the game window comprising a live gameplay of the first in-game action and one or more interactive action buttons operable to allow the first user to perform one or more in-game actions; receiving, by the first client system, an indication of the first user performing a second in-game action via the one or more interactive action buttons; and sending, by the first client system to a second client system, a second notification that the first user has performed the second in-game action in the game session.

20 Claims, 16 Drawing Sheets

Related U.S. Application Data

(60) Provisional application No. 62/486,324, filed on Apr. 17, 2017.

(51) Int. Cl.

| | | |
|---|---|---|
| *A63F 13/35* | (2014.01) | |
| *H04L 51/00* | (2022.01) | |
| *H04L 51/046* | (2022.01) | |
| *A63F 13/795* | (2014.01) | |
| *A63F 13/92* | (2014.01) | |
| *H04L 67/53* | (2022.01) | |
| *H04M 1/72436* | (2021.01) | |
| *A63F 13/30* | (2014.01) | |
| *A63F 13/79* | (2014.01) | |
| *H04L 51/02* | (2022.01) | |
| *H04L 51/063* | (2022.01) | |
| *H04L 51/52* | (2022.01) | |
| *H04L 67/131* | (2022.01) | |
| *H04M 1/72427* | (2021.01) | |

(52) U.S. Cl.
CPC ............ *A63F 13/795* (2014.09); *A63F 13/92* (2014.09); *H04L 51/02* (2013.01); *H04L 51/046* (2013.01); *H04L 51/063* (2013.01); *H04L 51/16* (2013.01); *H04L 51/32* (2013.01); *H04L 67/20* (2013.01); *H04L 67/38* (2013.01); *H04M 1/72436* (2021.01); *H04M 1/72427* (2021.01)

(56) References Cited

U.S. PATENT DOCUMENTS

2017/0366478 A1    12/2017    Mohammed et al.
2018/0280812 A1    10/2018    Vaccari et al.
2018/0304159 A1*   10/2018    Campos ................ A63F 13/46

* cited by examiner

GAMEPLAY THREADS IN MESSAGING APPLICATIONS

PRIORITY

This application is a continuation under 35 U.S.C. § 120 of U.S. patent application Ser. No. 15/783,905, filed 13 Oct. 2017, which claims the benefit, under 35 U.S.C. § 119(e), of U.S. Provisional Patent Application No. 62/486,324, filed 17 Apr. 2017, which is incorporated herein by reference.

TECHNICAL FIELD

This disclosure generally relates to online games and enhancing the online gameplay experience within an online communications environment, such as those for online messaging or social-networking systems.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g. wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

Social-graph analysis views social relationships in terms of network theory consisting of nodes and edges. Nodes represent the individual actors within the networks, and edges represent the relationships between the actors. The resulting graph-based structures are often very complex. There can be many types of nodes and many types of edges for connecting nodes. In its simplest form, a social graph is a map of all of the relevant edges between all the nodes being studied.

Online games are now played on various types of computing devices. An online game is a game that is either partially or primarily played by one or more users who communicate through the Internet or other data communication protocols. Conventional online game sessions are hosted or managed by a game server, which is typically one or more dedicated computers managed by the game publisher or other company. Users typically initiate online game sessions by directly accessing a web page of a third-part game server. Alternatively, applications or console games may communicate with a server to exchange score information, game updates, etc.

Over the last several years, a messaging network/system (separate entity or part of a social-networking system) has become a useful way to connect with acquaintances or businesses, e.g., to communicate. The messaging system may have a messaging application that users can access through their client systems. The messaging application may enable two or more users to communicate with each other, e.g., by exchanging messages. The messaging application has a tremendous opportunity to engage user(s) in online games and to enhance their gameplay experience.

SUMMARY OF PARTICULAR EMBODIMENTS

In particular embodiments, a messaging system (independently or in cooperation with a social-networking system) may provide a dedicated games-tab element on a messaging application for the discovery of games. A user may be able to access the messaging application through a client system connected to a network. On interacting with the games-tab element, a games tab may be shown comprising a dynamic list of games that is constantly updated as the user interacts with one or more games in the list. The games tab can initially provide a simple list of games (e.g., for first time users), but can be iteratively transformed into a more customized list that includes both games recently interacted with by the user and game data for each of these games (including, for example, message threads, total players playing the game, friends playing the game, last moves, current scores, challenges, recent messages from other players/bots, etc.).

In particular embodiments, the messaging system (independently or in cooperation with the social-networking system) may enable game developers to establish a direct relationship between players and games inside message threads on the messaging application with the help of programmable game channels (also interchangeably referred to herein as game bots). The messaging system may enable the use of these game bots in the messaging application by providing an application programming interface (API) to the game developers. A game developer may use the API to design a game bot that may automatically send one or more messages and/or updates to a user/player based on his interactions with the game. As an example and not by way of limitation, the game bot may send a welcome message when a user plays his first game, options to challenge friends, announcements of new releases and/or game features, etc.

In particular embodiments, the messaging system (independently or in cooperation with the social networking system) may provide gameplay threads that allow users to take in-game actions from within their message threads. Using a gameplay message thread, a user may be able to play a game with other users and see game status information from within the message thread without having to go to the game directly and leaving his messaging application. The messaging system may allow a game developer to send customized messages in a message thread. A customized message may include customizable text and button(s), user photo, an interactive screenshot of the game, etc. The screenshot in the customized message is interactive meaning that when a user interacts with the screenshot, a short video preview of the other user's gameplay could be shown, and then a message allowing a follow-up action could be sent to the user. Also, the text/button associated with the screenshot may be customized (e.g., button "Play" may be customized to say "Challenge" or "Join the game", etc.).

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

System Overview

Figure 1:
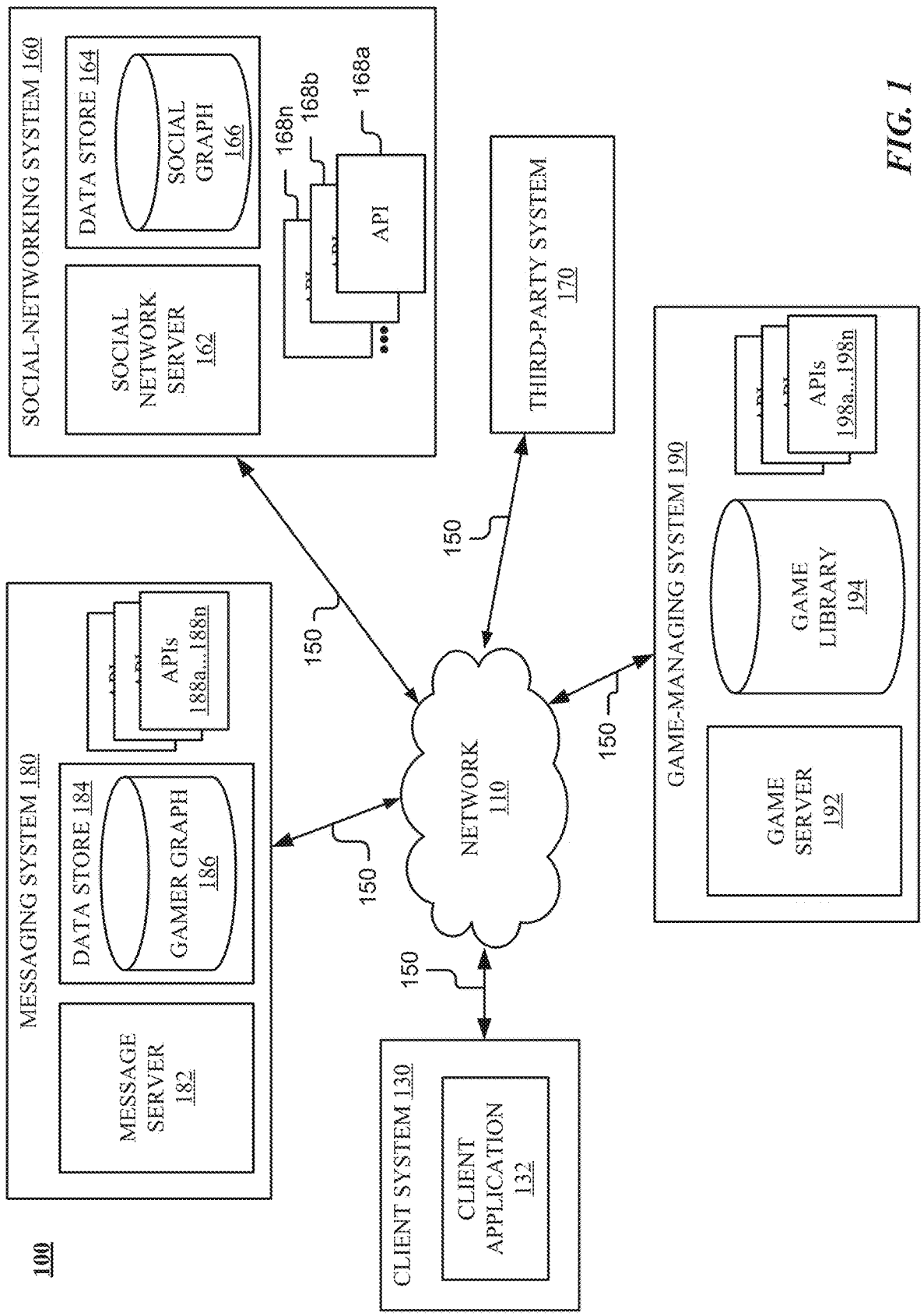
FIG. 1 illustrates an example network environment associated with a messaging system.

FIG. 1 illustrates an example network environment 100 associated with a messaging system. Network environment 100 includes a client system 130, a social-networking system 160, a third-party system 170, a messaging system 180, and a game-managing system 190 connected to each other by a network 110. Although FIG. 1 illustrates a particular arrangement of a client system 130, a social-networking system 160, a third-party system 170, a messaging system 180, a game-managing system 190, and a network 110, this disclosure contemplates any suitable arrangement of a client system 130, a social-networking system 160, a third-party system 170, a messaging system 180, a game-managing system 190, and a network 110. As an example and not by way of limitation, two or more of a client system 130, a social-networking system 160, a third-party system 170, a messaging system 180, and a game-managing system 190 may be connected to each other directly, bypassing a network 110. As another example, two or more of a client system 130, a social-networking system 160, a third-party system 170, a messaging system 180, and a game-managing system 190 may be physically or logically co-located with each other in whole or in part. Moreover, although FIG. 1 illustrates a particular number of client systems 130, social-networking systems 160, third-party systems 170, messaging systems 180, game-managing systems 190, and networks 110, this disclosure contemplates any suitable number of client systems 130, social-networking systems 160, third-party systems 170, messaging systems 180, game-managing systems 190, and networks 110. As an example and not by way of limitation, network environment 100 may include multiple client systems 130, social-networking systems 160, third-party systems 170, messaging systems 180, game-managing systems 190, and networks 110.

This disclosure contemplates any suitable network 110. As an example and not by way of limitation, one or more portions of a network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 110 may include one or more networks 110.

Links 150 may connect a client system 130, a social-networking system 160, a third-party system 170, a messaging system 180, and a game-managing system 190 to a communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout a network environment 100. One or more first links 150 may differ in one or more respects from one or more second links 150.

In particular embodiments, a client system 130 may be an electronic device including hardware, software, or embedded logic components or a combination of two or more such components and capable of carrying out the appropriate functionalities implemented or supported by a client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at a client system 130 to access a network 110. A client system 130 may enable its user to communicate with other users at other client systems 130.

In particular embodiments, a client system 130 may include a client application 132, which may be a web browser, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at a client system 130 may enter a Uniform Resource Locator (URL) or other address directing a web browser to a particular server (such as social network server 162, message server 182, game server 192, or a server associated with a third-party system 170), and the web browser may generate a Hyper Text Transfer Protocol (HTTP) request and communicate the HTTP request to server. The server may accept the HTTP request and communicate to a client system 130 one or more Hyper Text Markup Language (HTML) files responsive to the HTTP request. The client system 130 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web interface encompasses one or more corresponding source files (which a browser may use to render the web interface) and vice versa, where appropriate.

In particular embodiments, the client application 132 may be an application operable to provide various computing functionalities, services, and/or resources, and to send data to and receive data from the other entities of the network 110, such as the social-networking system 160, the third-party system 170, the messaging system 180, and/or the game-managing system 190. For example, the client application 132 may be a social-networking application, a messaging application for messaging with users of a messaging network/system, a gaming application, an internet searching application, etc.

In particular embodiments, the client application 132 may be storable in a memory and executable by a processor of the client system 130 to render user interfaces, receive user input, send data to and receive data from one or more of the social-networking system 160, the third-party system 170, the messaging system 180, and the game-managing system 190. The client application 132 may generate and present user interfaces to a user via a display of the client system 130. For example, the client application 132 may generate and present user interfaces, as depicted in at least FIGS. 6A, 6B, 8A-8C, 10A-10C, 11A, 11B, and 12, based at least in part on information received from the messaging system 180 via the network 110.

In particular embodiments, the social-networking system 160 may be a network-addressable computing system that can host an online social network. The social-networking system 160 may generate, store, receive, and send social-networking data, such as, for example, user-profile data, concept-profile data, social-graph information, or other suitable data related to the online social network. The social-networking system 160 may be accessed by the other components of network environment 100 either directly or via a network 110. As an example and not by way of limitation, a client system 130 may access the social-networking system 160 using the client application 132, which may be a web browser or a native application associated with the social-networking system 160 (e.g., a mobile social-networking application, another suitable application, or any combination thereof) either directly or via a network 110.

In particular embodiments, the social-networking system 160 may include a social network server 162. The social network server 162 may be a computing device for managing the online social network hosted on the social-networking system 160. The server 162 may be a unitary server or a distributed server spanning multiple computers or multiple datacenters. In particular embodiments, the social network server 162 may include hardware, software, or embedded logic components or a combination of two or more such components for carrying out the appropriate functionalities implemented or supported by server 162. Although a single social network server 162 is shown, it should be noted that this is not by any way limiting and this disclosure contemplates any number of social network servers 162.

In particular embodiments, the social-networking system 160 may include a data store 164. The data store 164 may be used to store various types of information. In particular embodiments, the information stored in the data store 164 may be organized according to specific data structures. In particular embodiments, the data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, a third-party system 170, a messaging system 180, or a game-managing system 190 to manage, retrieve, modify, add, or delete, the information stored in the data store 164.

In particular embodiments, the social-networking system 160 may store a social graph 166 in the data store 164. In particular embodiments, a social graph 166 may include multiple nodes—which may include multiple user nodes (each corresponding to a particular user) or multiple concept nodes (each corresponding to a particular concept)—and multiple edges connecting the nodes. The social-networking system 160 may provide users of the online social network the ability to communicate and interact with other users. In particular embodiments, users may join the online social network via the social-networking system 160 and then add connections (e.g., relationships) to a number of other users of the social-networking system 160 whom they want to be connected to. Herein, the term "friend" may refer to any other user of the social-networking system 160 with whom a user has formed a connection, association, or relationship via the social-networking system 160. The social graph 166 is discussed in further detail below in reference to at least FIG. 4.

In particular embodiments, the social-networking system 160 may provide users with the ability to take actions on various types of items or objects, supported by the social-networking system 160. As an example and not by way of limitation, the items and objects may include groups or social networks to which users of the social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 160 or by an external system of a third-party system 170, which is separate from the social-networking system 160 and coupled to the social-networking system 160 via a network 110.

In particular embodiments, the social-networking system 160 may be capable of linking a variety of entities. As an example and not by way of limitation, the social-networking system 160 may enable users to interact with each other as well as receive content from the third-party system 170, the messaging system 180, or the game-managing system 190, or to allow users to interact with these entities through an application programming interface (API) or other communication channels. As depicted, the social-networking system 160 may include a plurality of application programming interfaces (APIs) 168a through 168n (individually and/or collectively herein referred to as 168). An API is set of routines, protocols, and tools by which the social-networking system 160 may be able to communicate with one or more other entities of the network environment 100. In some embodiments, an API may be defined for each application associated with the social-networking system 160. For example, API 168a may be a social-networking application API, 168b may be a social-graph API, 168c may be an advertising API, so on and so forth. In some embodiments, an API may be defined by one or more developers associated with the social-networking system 160. In some embodiments, an API of the social-networking system 160 may be sent to one or more other entities of the network environment 100 (e.g., via an API handler 202) that may enable them to add one or more additional features to the existing API of the social network system 160.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating the social-networking system 160, the messaging system 180, or the game-managing system 190. In particular embodiments, one or more of the social-networking system 160, the messaging system 180, or the game-managing system 190, and the third-party system 170 may operate in conjunction with each other to provide various services/functionalities to users. For example, the social-networking system 160 and the third-party system 170 may operate in conjunction with each other to provide social-networking services to users of the social-networking system 160 or third-party systems 170. In this sense, the social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 160 also includes user-generated content objects, which may enhance a user's interactions with the social-networking system 160. User-generated content may include anything a user can add, upload, send, or "post" to the social-networking system 160. As an example and not by way of limitation, a user communicates posts to the social-networking system 160 from a client system 130. Posts may include data such as status updates or other textual data, location information, photos, videos, links, music or other similar data or media. Content may also be added to the social-networking system 160 by a third-party through a "communication channel," such as a newsfeed or stream.

In particular embodiments, the social-networking system 160 may include a variety of servers, sub-systems, programs, modules, logs, and data stores. In particular embodiments, the social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 160 may also include suitable components such as network interfaces, security mechanisms, load balancers, failover servers, management-and-network-operations consoles, other suitable components, or any suitable combination thereof.

In particular embodiments, the social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external).

A web server may be used for linking the social-networking system 160 to one or more of the client system 130, the third-party system 170, the messaging system 180, or the game-managing system 190 via a network 110. The web server may include a mail server or other messaging functionality for receiving and routing messages between the social-networking system 160 and one or more client systems 130. An API-request server may allow a third-party system 170, a messaging system 180, and/or a game-managing system 190 to access information from the social-networking system 160 by calling one or more APIs. An action logger may be used to receive communications from a web server about a user's actions on or off the social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from a client system 130 responsive to a request received from a client system 130. Authorization servers may be used to enforce one or more privacy settings of the users of the social-networking system 160. A privacy setting of a user determines how particular information associated with a user can be shared. The authorization server may allow users to opt in to or opt out of having their actions logged by the social-networking system 160 or shared with other systems (e.g., a third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

In particular embodiments, the messaging system 180 may be a network-addressable computing system that can host an online messaging network. The messaging system 180 may enable users to interact with each other via a messaging application that they can access through their client systems 130. The messaging system 180 may allow a user to send/receive messages, watch videos, share images, play games, etc. with other users connected to the online messaging network. The messaging system 180 may be accessed by one or more entities of the network environment 100 either directly or via the network 110. As an example and not by way of limitation, a client system 130 may access the messaging system 180 using the client application 132, which may be a native application associated with the messaging system (e.g., a messaging application), either directly or via the network 110.

In some embodiments, the messaging system 180 and the social-networking system 160 may operate in conjunction with each other to provide messaging services discussed herein to users of the messaging system 180. In this sense, the social-networking system 160 may provide a platform, or backbone, which the messaging system 180 may use to provide messaging services and functionalities to users across the online messaging network. In some embodiments, the messaging system 180 and the social-networking system 160 may be combined into one single entity and that entity may be responsible for providing the various social-networking and messaging services/functionalities to users across the Internet. For example, a single entity may include the various elements/components of the social-networking system 160 and the messaging system 180, such as a social network server 162, a message server 182, a data store (including a social graph 166 and gamer graph 186), APIs 168a through 168n, and APIs 188a through 1888n. In some embodiments, the messaging system 180 and the social-networking system 160 may be linked to each other via one or more APIs. For example, the messaging system 180 or the social-networking system 160 may call an API of the other entity to host or provide service(s) associated with the other entity in its own environment. In some embodiments, the messaging system 180 and the social-networking system 160 may operate as independent entities and may communicate with one another via the network 110 as depicted in FIG. 1. It should be noted that various other configurations by which the various entities of the network environment 100 may interact with each other are possible and is within the scope of the present disclosure.

In particular embodiments, the messaging system 180 may include a message server 182. The message server 182 may be a computing device for managing the messaging network and associated services/functionalities hosted on the messaging system 180. The message server may include hardware, software, or embedded logic components or a combination of two or more components for carrying out the appropriate functions or processes discussed herein. Although the messaging system 180 is shown here to be including a single message server 182, it should be noted that this is not by any way limiting and this disclosure contemplates any number of message servers 182.

In particular embodiments, the messaging system 180 may include a data store 184. The data store 184 may be used to store various types of information. In particular embodiments, the information stored in the data store 184 may be organized according to specific data structures. In particular embodiments, the data store 184 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, a game-managing system 190 and/or a third-party system 170 to manage, retrieve, modify, add, or delete, the information stored in data store 184. Although a single data store 184 is shown as being associated with the messaging system 180, it should be noted that this is not by any way limiting and this disclosure contemplates any number of data stores 184.

In particular embodiments, the messaging system 180 may store a gamer graph 186 in the data store 184. In particular embodiments, the gamer graph 186 may include multiple nodes—which may include multiple gamer nodes or multiple game nodes—and multiple edges connecting the nodes. The gamer graph 186 may be used to determine a "game affinity" for a first user with respect to a second user based on the degree-of-separation within the graph, as well as other interactions, such as user frequency of interaction with a game, with other users, etc. The "game affinity" and these other interactions may be used to suggest one or more games to a user and/or suggest one or more other users/players for game challenges or invites. The gamer graph 186 is discussed in further detail below in reference to at least FIG. 5.

In particular embodiments, the messaging system 180 may include a plurality of application programming interfaces (APIs) 188a through 188n (individually and/or collectively herein referred to as 188). An API 188 may enable the messaging system 180 to communicate with one or more other entities of the network environment 100. For example, using API(s) 188, the messaging system 180 may be able to send data to and/or receive data from the social networking system 160, the game-managing system 190, or the third-party system 170. In some embodiments, an API may be defined for each application associated with the messaging system 180. For example, API 188a may be a messaging application API, 188b may be a gamer graph API, etc. In some embodiments, an API may be defined by one or more developers associated with the messaging system 180. In some embodiments, an API of the messaging system 180 may be sent to one or more other entities of the network environment 100 that may enable them to add one or more additional features to an existing API of the messaging system 180. As an example and not by way of limitation, a messaging application API of the messaging system 180 may be provided to a game developer associated with the game-managing system 190 to add one or more game relating features to the messaging application as discussed in reference to at least FIG. 3B.

In particular embodiments, the game-managing system 190 may be a network-addressable computing system that can host an online gaming network. For instance, the game-managing system 190 may enable users across the Internet to play a variety of games with each other or individually. The game-managing system 190 may be accessed by one or more entities of the network environment 100 either directly or via the network 110. As an example and not by way of limitation, the messaging system 180 may access the game-managing system 190 by way of one or more APIs (e.g., API calls) as shown in at least in FIG. 3A. API calls may be handled by an API hander, such as an API handler 202 shown in FIG. 2.

In particular embodiments, the game-managing system 190 may include a game server 192. The game server 192 may be a computing device for managing the online gaming network hosted on and associated services/functionalities provided by the game-managing system 190. The game server 192 may include hardware, software, or embedded logic components or a combination of two or more components for carrying out the appropriate functions or processes discussed herein. Although a single game server 192 is shown here, it should be noted that this is not by any way limiting and this disclosure contemplates any number of game servers 192.

In particular embodiments, the game-managing system 190 may include a game library 194. The game library 194 may include a plurality of online games that may be hosted on the game server 192. The game library 194 may include games categorized and/or grouped by their respective genres. For example, the game library 194 may include games grouped by action, adventure, racing, puzzle, etc. In some embodiments, the game library 194 is a data store that is accessible and/or modifiable by the game server 192. For instance, the game server 192 may be able to manage, retrieve, modify, add, or delete, the information stored in game library 194.

In particular embodiments, the game-managing system 190 may include a plurality of application programming interfaces (APIs) 198a through 198n (individually and/or collectively herein referred to as 198). An API 198 may enable the game-managing system 190 to communicate with one or more other entities of the network environment 100. For example, using API(s) 198, the game-managing system 190 may be able to send data to and/or receive data from the social networking system 160, the third-party system 170, or the messaging system 180. In some embodiments, an API may be defined for each application associated with the game-managing system 190. For example, API 198a may be a games API, 198b may be a leaderboard API, 198c may be a gamer-profile API, etc. In some embodiments, an API may be defined by a game developer associated with the game-managing system 190. In some embodiments, an API of the game-managing system 190 may be sent to one or more other entities of the network environment 100 that may enable them to add one or more additional features to the existing API. As an example and not by way of limitation, a games API of the game-managing system 190 may be provided to messaging system 180 for it to integrate games as part of its messaging network as discussed in reference to at least FIG. 3A.

In connection with network environments for online games, particular embodiments may utilize one or more systems, components, elements, functions, methods, operations, or steps disclosed in U.S. patent application Ser. No. 15/475,801, filed 31 Mar. 2017, which is incorporated by reference.

Figure 2:
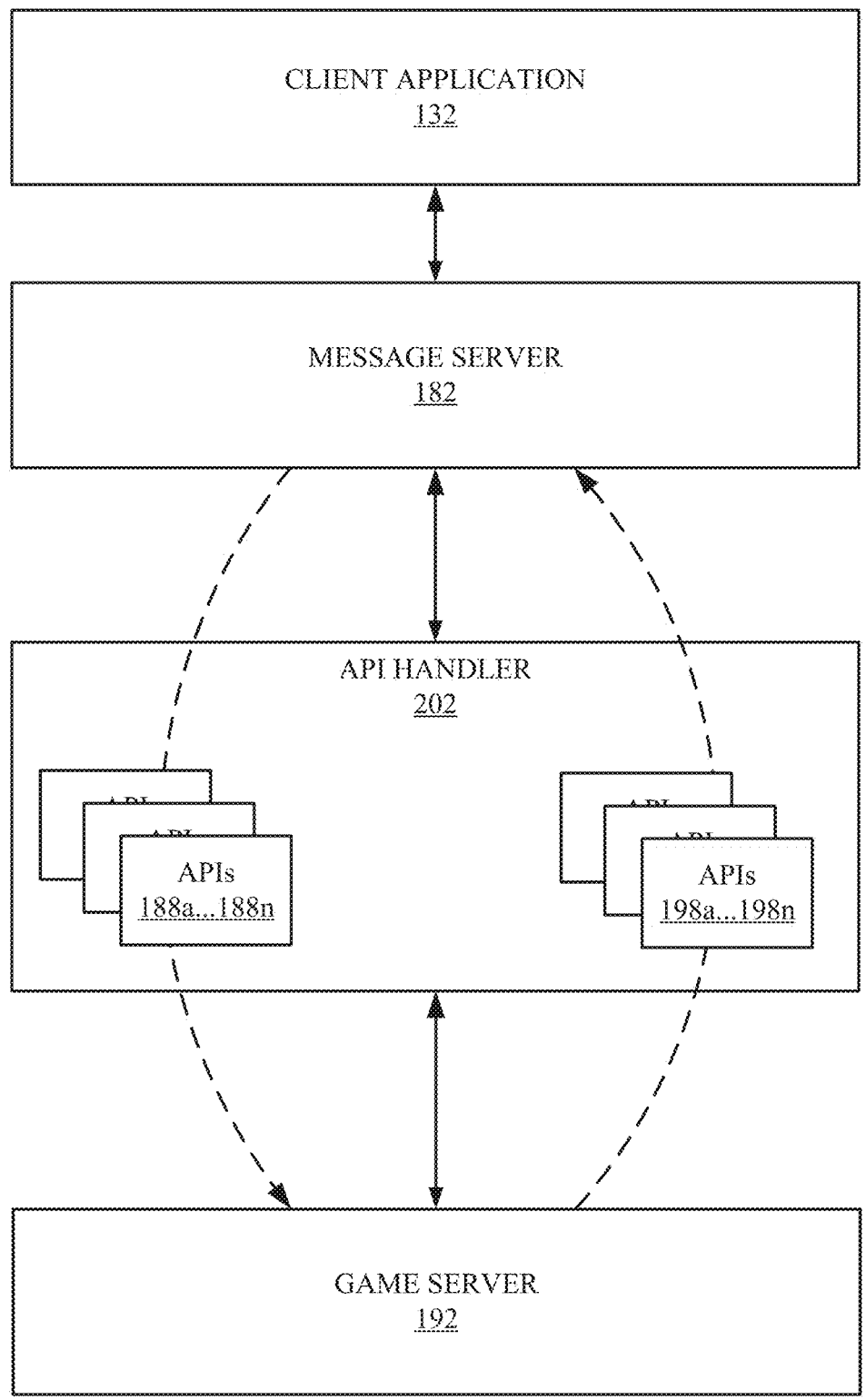
FIG. 2 is a block diagram illustrating an example environment in which a client system, a messaging system, and a game-managing system may interact with each other.

FIG. 2 is a block diagram illustrating an example environment 200 in which a client system 130, a messaging system 180, and a game-managing system 190 may interact with each other. Specifically, FIG. 2 shows an environment 200 in which the client application 132, the message server 182, and the game server 192 may interact with one another. The client application 132 may be connected to the message server 182 via the network 110 (e.g., internet) to send request(s)/receive response(s). In particular embodiments, the client application 132 may be a messaging application running on the client system 130 of a user. The messaging application is operable to provide one or more functionalities to the user (e.g., chatting, games, etc.) in cooperation with the message server 182.

The message server 182 and the game server 192 may interact with each other via APIs. For instance, the message server 182 may send one or more of its APIs 188 to and/or receive one or more of the APIs 198 from the game server 192. Similarly, the game server 192 may send one or more of its APIs 198 to and/or receive one or more of the APIs 188 from the message server 182. This transfer of APIs is shown and discussed in detail in reference to FIGS. 3A and 3B. The transfer of APIs or API calls may be handled by an API handler 202. The API handler 202 is a software, logic, and/or routine for handling API requests/calls from one entity to another. For example, the API handler 202 may receive a request from the message server 182 for an API 198 of the game server 192. The API handler 202 may transfer the request to the game server 192 and in response receive the requested API and then send that API to the message server 182 to fulfil the request. Similarly, the API handler 202 may handle a request for an API associated with the message server 182 from the game server 192. As another example, the API handler 202 may enable the message server 182 and the game server 192 to access functionalities of one another by handling API calls between the two parties.

Figure 3A:
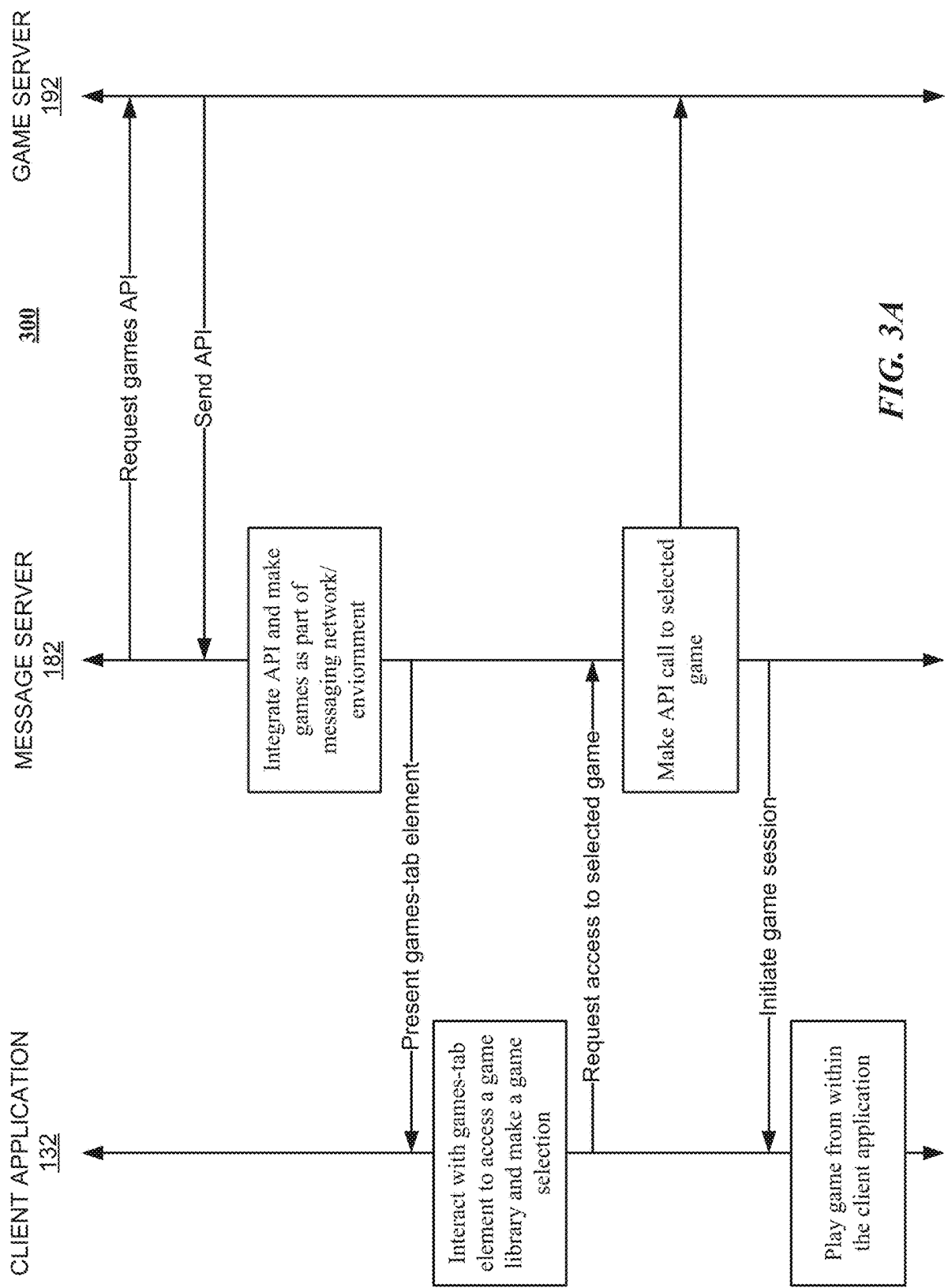
FIGS. 3A and 3B are example interaction/flow diagrams illustrating example interactions between a client system, a messaging system, and a game-managing system.
Figure 3B:
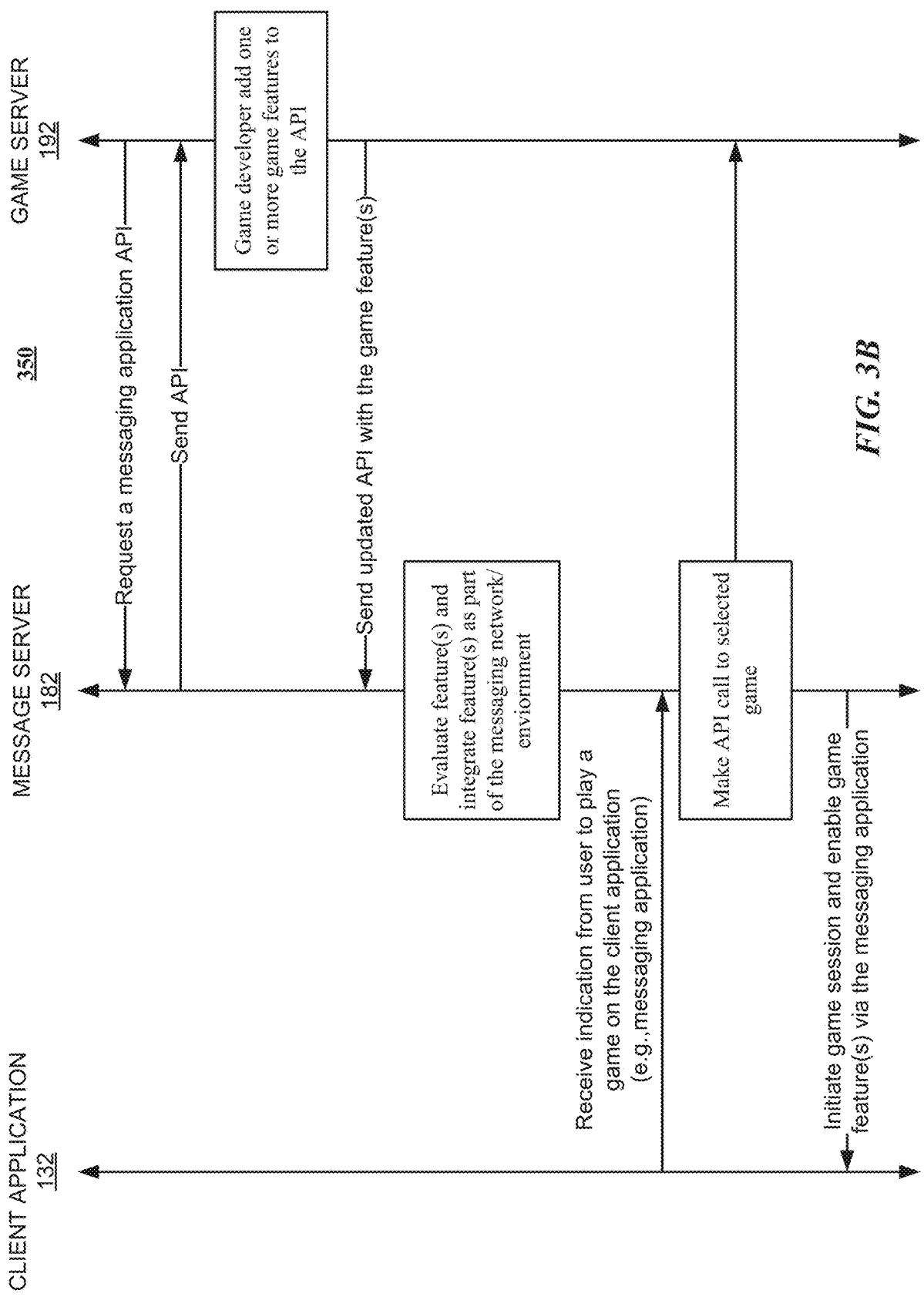

FIGS. 3A and 3B are example interaction/flow diagrams illustrating example interactions between a client system 130, a messaging system 180, and a game-managing system 190. In particular, FIG. 3A is an example interaction/flow diagram 300 showing one exemplary way by which the message server 182 requests an API from the game server 192 and provide a service to a user associated with the client application 132. FIG. 3B is an example interaction/flow diagram 350 showing one exemplary way by which the game server 192 requests an API from the message server 182 and use that API to add one or more additional features that the user can leverage through the client application 132 (e.g., messaging application). It should be noted that the interaction/flow diagrams shown in FIGS. 3A and 3B are for exemplary purposes only and are not by any way limited to these interactions. A variety of other interactions are also possible between these entities and is within the scope of the present disclosure.

As depicted in FIG. 3A, the message server 182 requests a games API from the game server 192. Upon receiving the request, the game server 192 looks for the requested API from plurality of APIs 198 stored in a data store and provides its games API to the message server 182. The message server 182 may integrate the games API as part of its messaging environment/network such that users of the messaging network may be able to play games via a messaging application (i.e., client application) on their client devices. Once integrated, the message server 182 may present a games-tab element on the client application 132, such as for example, the games-tab element 600 shown in FIG. 6A. A user of the client application 132 may select the games-tab element to access a list of games and make a game selection. A request to access the selected game is sent to the message server 182, which then makes an API call to the game server 192 for initiating the selected game. The API call and any communication between the message server 182 and the game server 192 may be handled by the API handler 202 as discussed elsewhere herein. Once the game is initiated, the user of the client application 132 may be able to play the game from within the client application.

Turning now to the example interaction diagram 350 in FIG. 3B, the game server 192 may request a messaging application API from the message server 182. Upon receiving the request, the message server 182 looks for the requested API from a plurality of APIs 188 stored in a data store and provides its messaging application API to the game server 192. A game developer of the game server 192 may add one or more features to the existing messaging application API. The one or more features may include, for example, a game bot that may engage with a user in a message thread (also referred to as a "context", discussed below in the "Game Channels" subsection), customized messages in a message thread (discussed below in the "Gameplay Threads" subsection), etc. Once the one or more features are added, the game server 192 may send the updated API back to the message server 182 via the API handler 202. A user at the message server 182 may evaluate the one or more features added by the game developer in the messaging application API and take a decision. The decision may be whether to add the features to the API or not. If the decision is affirmative, then the one or more features are integrated as part of the messaging network.

The message server 182 may receive an indication from the client application 132 (e.g., messaging application) that a user is requesting access to a game. The message server 182 may make an API call to the game server 192 for initiating the game. The API call and any communication between the message server 182 and the game server 192 may be handled by the API handler 202 as discussed elsewhere herein. Once the game is initiated, the user of the client application 132 may be able to play the game and leverage the one or more additional features from within the client application 132 or without having to leave the client application 132.

Social Graphs

Figure 4:
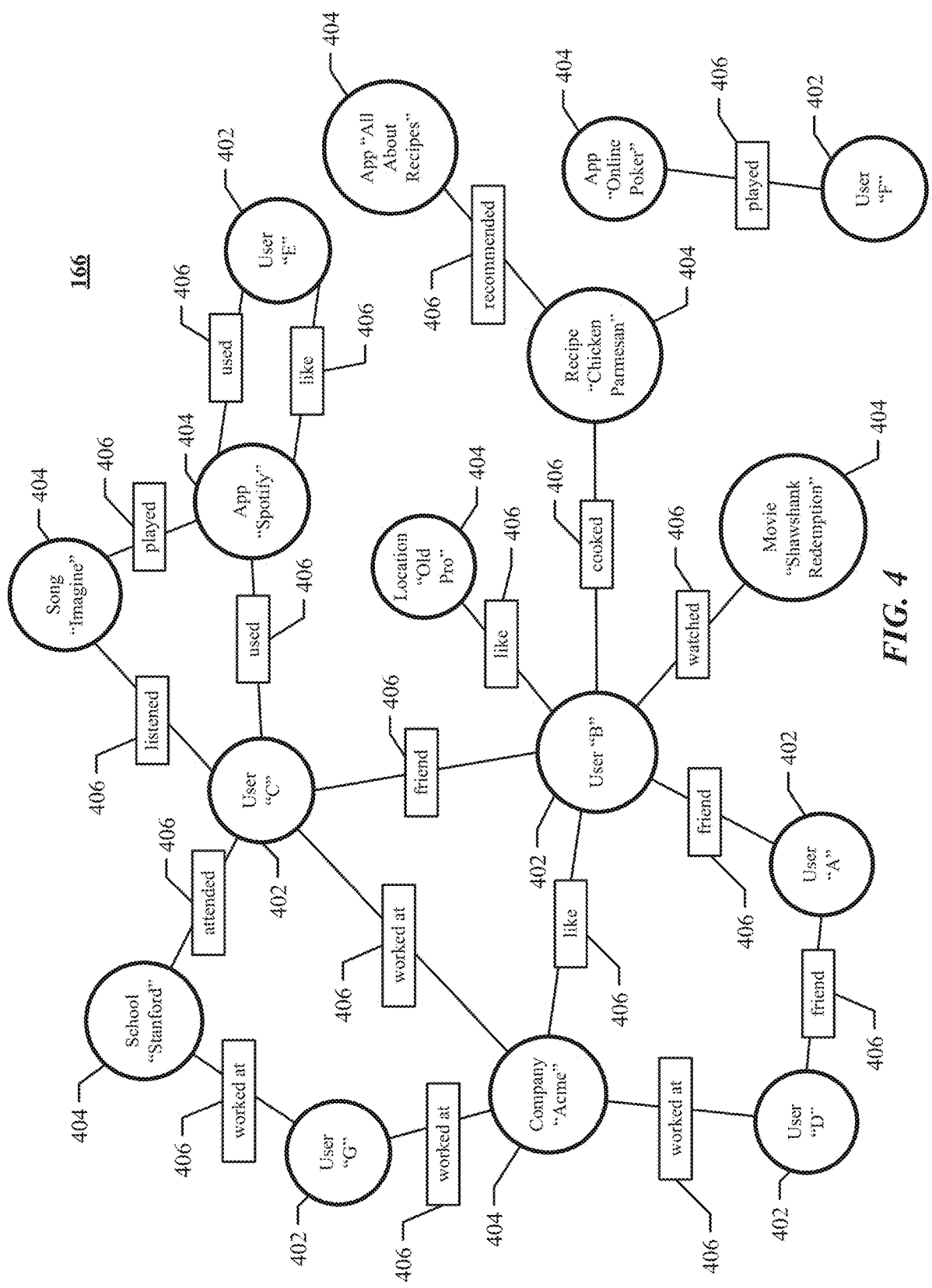
FIG. 4 illustrates an example social graph.

FIG. 4 illustrates an example social graph 166. In particular embodiments, the social-networking system 160 may store one or more social graphs 166 in one or more data stores. In particular embodiments, the social graph 166 may include multiple nodes—which may include multiple user nodes 402 or multiple concept nodes 404—and multiple edges 406 connecting the nodes. The example social graph 166 illustrated in FIG. 4 is shown, for didactic purposes, in a two-dimensional visual map representation. In particular embodiments, a social-networking system 160, a client system 130, a third-party system 170, a messaging system 180, or a game-managing system 190 may access the social graph 166 and related social-graph information for suitable applications. The nodes and edges of the social graph 166 may be stored as data objects, for example, in a data store (such as a social-graph database). Such a data store may include one or more searchable or queryable indexes of nodes or edges of the social graph 166.

In particular embodiments, a user node 402 may correspond to a user of the social-networking system 160. As an example and not by way of limitation, a user may be an individual (human user), an entity (e.g., an enterprise, business, or third-party application), or a group (e.g., of individuals or entities) that interacts or communicates with or over the social-networking system 160. In particular embodiments, when a user registers for an account with the social-networking system 160, the social-networking system 160 may create a user node 402 corresponding to the user, and store the user node 402 in one or more data stores. Users and user nodes 402 described herein may, where appropriate, refer to registered users and user nodes 402 associated with registered users. In addition or as an alternative, users and user nodes 402 described herein may, where appropriate, refer to users that have not registered with the social-networking system 160. In particular embodiments, a user node 402 may be associated with information provided by a user or information gathered by various systems, including the social-networking system 160. As an example and not by way of limitation, a user may provide his or her name, profile picture, contact information, birth date, sex, marital status, family status, employment, education background, preferences, interests, or other demographic information. In particular embodiments, a user node 402 may be associated with one or more data objects corresponding to information associated with a user. In particular embodiments, a user node 402 may correspond to one or more web interfaces.

In particular embodiments, a concept node 404 may correspond to a concept. As an example and not by way of limitation, a concept may correspond to a place (such as, for example, a movie theater, restaurant, landmark, or city); a website (such as, for example, a website associated with the social-networking system 160 or a third-party website associated with a web-application server); an entity (such as, for example, a person, business, group, sports team, or celebrity); a resource (such as, for example, an audio file, video file, digital photo, text file, structured document, or application) which may be located within the social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 404 may be associated with information of a concept provided by a user or information gathered by various systems, including the social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 404 may be associated with one or more data objects corresponding to information associated with concept node 404. In particular embodiments, a concept node 404 may correspond to one or more web interfaces.

In particular embodiments, a node in the social graph 166 may represent or be represented by a web interface (which may be referred to as a "profile interface"). Profile interfaces may be hosted by or accessible to the social-networking system 160. Profile interfaces may also be hosted on third-party websites associated with a third-party system 170. As an example and not by way of limitation, a profile interface corresponding to a particular external web interface may be the particular external web interface and the profile interface may correspond to a particular concept node 404. Profile interfaces may be viewable by all or a selected subset of other users. As an example and not by way of limitation, a user node 402 may have a corresponding user-profile interface in which the corresponding user may add content, make declarations, or otherwise express himself or herself. As another example and not by way of limitation, a concept node 404 may have a corresponding concept-profile interface in which one or more users may add content, make declarations, or express themselves, particularly in relation to the concept corresponding to concept node 404.

In particular embodiments, a concept node 404 may represent a third-party web interface or resource hosted by a third-party system 170. The third-party web interface or resource may include, among other elements, content, a selectable or other icon, or other inter-actable object (which may be implemented, for example, in JavaScript, AJAX, or PHP codes) representing an action or activity. As an example and not by way of limitation, a third-party web interface may include a selectable icon such as "like," "check-in," "eat," "recommend," or another suitable action or activity. A user viewing the third-party web interface may perform an action by selecting one of the icons (e.g., "check-in"), causing a client system 130 to send to the social-networking system 160 a message indicating the user's action. In response to the message, the social-networking system 160 may create an edge (e.g., a check-in-type edge) between a user node 402 corresponding to the user and a concept node 404 corresponding to the third-party web interface or resource and store edge 406 in one or more data stores.

In particular embodiments, a pair of nodes in the social graph 166 may be connected to each other by one or more edges 406. An edge 406 connecting a pair of nodes may represent a relationship between the pair of nodes. In particular embodiments, an edge 406 may include or represent one or more data objects or attributes corresponding to the relationship between a pair of nodes. As an example and not by way of limitation, a first user may indicate that a second user is a "friend" of the first user. In response to this indication, the social-networking system 160 may send a "friend request" to the second user. If the second user confirms the "friend request," the social-networking system 160 may create an edge 406 connecting the first user's user node 402 to the second user's user node 402 in the social graph 166 and store edge 406 as social-graph information in one or more of data stores 164. In the example of FIG. 4, the social graph 166 includes an edge 406 indicating a friend relation between user nodes 402 of user "A" and user "B" and an edge indicating a friend relation between user nodes 402 of user "C" and user "B." Although this disclosure describes or illustrates particular edges 406 with particular attributes connecting particular user nodes 402, this disclosure contemplates any suitable edges 406 with any suitable attributes connecting user nodes 402. As an example and not by way of limitation, an edge 406 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in the social graph 166 by one or more edges 406.

In particular embodiments, an edge 406 between a user node 402 and a concept node 404 may represent a particular action or activity performed by a user associated with user node 402 toward a concept associated with a concept node 404. As an example and not by way of limitation, as illustrated in FIG. 4, a user may "like," "attended," "played," "listened," "cooked," "worked at," or "watched" a concept, each of which may correspond to an edge type or subtype. A concept-profile interface corresponding to a concept node 404 may include, for example, a selectable "check in" icon (such as, for example, a clickable "check in" icon) or a selectable "add to favorites" icon. Similarly, after a user clicks these icons, the social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, the social-networking system 160 may create a "listened" edge 406 and a "used" edge (as illustrated in FIG. 4) between user nodes 402 corresponding to the user and concept nodes 404 corresponding to the song and application to indicate that the user listened to the song and used the application. Moreover, the social-networking system 160 may create a "played" edge 406 (as illustrated in FIG. 4) between concept nodes 404 corresponding to the song and the application to indicate that the particular song was played by the particular application. In this case, "played" edge 406 corresponds to an action performed by an external application (SPOTIFY) on an external audio file (the song "Imagine"). Although this disclosure describes particular edges 406 with particular attributes connecting user nodes 402 and concept nodes 404, this disclosure contemplates any suitable edges 406 with any suitable attributes connecting user nodes 402 and concept nodes 404. Moreover, although this disclosure describes edges between a user node 402 and a concept node 404 representing a single relationship, this disclosure contemplates edges between a user node 402 and a concept node 404 representing one or more relationships. As an example and not by way of limitation, an edge 406 may represent both that a user likes and has used at a particular concept. Alternatively, another edge 406 may represent each type of relationship (or multiples of a single relationship) between a user node 402 and a concept node 404 (as illustrated in FIG. 4 between user node 402 for user "E" and concept node 404 for "SPOTIFY").

In particular embodiments, the social-networking system 160 may create an edge 406 between a user node 402 and a concept node 404 in the social graph 166. As an example and not by way of limitation, a user viewing a concept-profile interface (such as, for example, by using a web browser or a special-purpose application hosted by the user's client system 130) may indicate that he or she likes the concept represented by the concept node 404 by clicking or selecting a "Like" icon, which may cause the user's client system 130 to send to the social-networking system 160 a message indicating the user's liking of the concept associated with the concept-profile interface. In response to the message, the social-networking system 160 may create an edge 406 between user node 402 associated with the user and concept node 404, as illustrated by "like" edge 406 between the user and concept node 404. In particular embodiments, the social-networking system 160 may store an edge 406 in one or more data stores. In particular embodiments, an edge 406 may be automatically formed by the social-networking system 160 in response to a particular user action. As an example and not by way of limitation, if a first user uploads a picture, watches a movie, or listens to a song, an edge 406 may be formed between user node 402 corresponding to the first user and concept nodes 404 corresponding to those concepts. Although this disclosure describes forming particular edges 406 in particular manners, this disclosure contemplates forming any suitable edges 406 in any suitable manner.

Gamer Graphs

Figure 5:
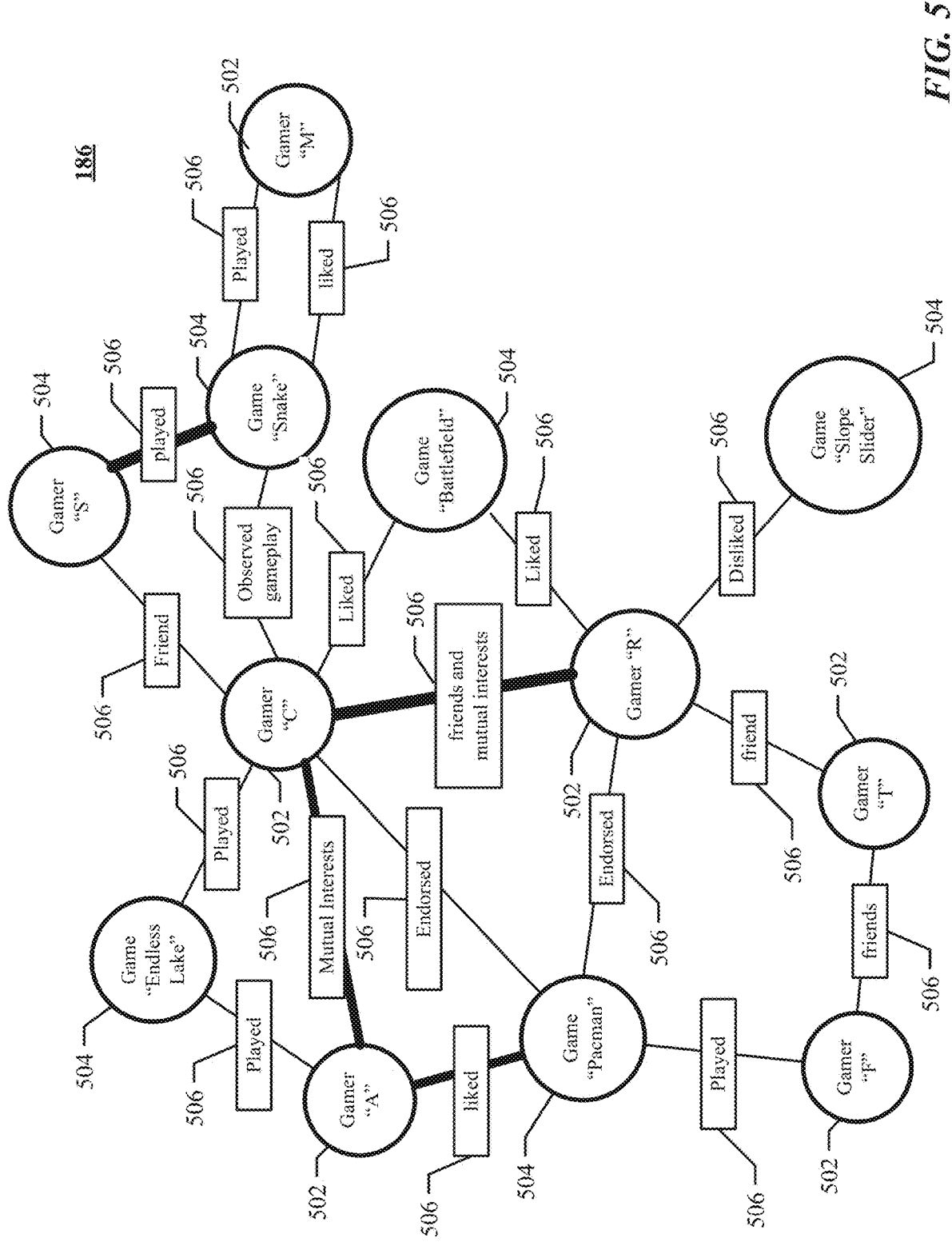
FIG. 5 illustrates an example gamer graph.

FIG. 5 illustrates an example gamer graph 186. In particular embodiments, the gamer graph 186 may include multiple nodes—which may include multiple gamer nodes 502 or multiple game nodes 504—and multiple edges 506 connecting the nodes. The gamer graph may be used to determine a "game affinity" for a first player with respect to a second player based on the degree-of-separation within the graph, as well as other interactions, such as player frequency of interaction with a game, with other players, etc. The "game affinity" and these other interactions may be used to suggest one or more games to a user and/or suggest one or more other users/players for game challenges or invites. The example gamer graph 186 illustrated in FIG. 5 is shown, for didactic purposes, in a two-dimensional visual map representation. In particular embodiments, a social-networking system 160, a client system 130, a third-party system 170, or a game-managing system 190 may access the gamer graph 186 and related information for suitable applications. The nodes and edges of the gamer graph 186 may be stored as data objects, for example, in a data store (such as a gamer-graph database). Such a data store may include one or more searchable or queryable indexes of nodes or edges of the gamer graph 186.

In particular embodiments, a gamer node 502 may correspond to a gamer of the messaging system 180. As an example and not by way of limitation, a gamer may be a user who is involved with one or more games and/or game-related activity on the messaging system 180. In particular embodiments, when a user interacts with a game and/or perform a game-related activity (e.g., like a game, share a game with friends, challenge friends in a game, send/receive game invites, etc.) on the messaging system 180, the messaging system 180 may create a gamer node 502 corresponding to the user, and store the gamer node 502 in one or more data stores.

In particular embodiments, a game node 504 may correspond to a game. As an example and not by way of limitation, a game node may correspond to a "Pacman" game, "Battlefield" game, "Snake" game, "Slope Slider" game, "Batman" game, "Mario" game, "Tetris" game, "Scrabble" game, "Chess", "EverWing" game, etc. In some embodiments, the messaging system 180 may create different game nodes 504 when one or more gamers interacts with one or more games. In some embodiments, the messaging system 180 may create game nodes by accessing a game library from a game-managing system 190 and then creating a node for each game.

In particular embodiments, a pair of nodes in the gamer graph 186 may be connected to each other by one or more edges 506. An edge 506 connecting a pair of nodes may represent a relationship between the pair of nodes. In particular embodiments, an edge 506 between a gamer node 502 and a game node 504 may represent a particular action or activity performed by a gamer toward a game. As an example and not by way of limitation, once user "A" associated with the game node 502 played the game "Endless Cake" associated with the game node 504, the messaging system 180 may create an edge 506 "played" (which may be referred to as a played-type edge 506) between the two nodes to indicate that "A" interacted with the game. As another example, user "R" associated with the gamer node 502 endorsed the "Pacman" game associated with the game node 504 on his newsfeed, the messaging system 160 may create an edge 506 "Endorsed" (an endorsed-type edge 506) to indicate the gamer's activity toward that game.

In particular embodiments, different type of edges may be used to indicate a certain degree of relationship or separation between two nodes. A degree of relationship between two gamer nodes is an indicator of gamer affinity of a first gamer with respect to a second gamer. For example, the bolded edges between two gamer nodes in the gamer graph 186 may represent a strong gamer affinity between the two players. By way of example, the edge 506 between the gamer node of "C" and the gamer node of "R" indicates a very strong gamer affinity between the two gamers as they have mutual interests for the games as well as they are also friends. As another example, the edge 506 between the gamer node of "C" and the gamer node of "A" indicates a fairly strong gamer affinity between the two gamers as they also have mutual interests for the games but they may or may not be friends.

In particular embodiments, different edge types may also be used to indicate a certain degree of relationship between a gamer node and a game node. This degree of relationship between a game and a gamer may be useful to determine a player likeness/preference towards the game or frequency of interaction with that game. For example, a bolded edge between the gamer node of "S" and the game node of "Snake" may indicate that the a frequency of interaction of gamer "S" with "Snake" game is relatively higher than other games which may be an indicator of user certain degree of preference towards this game.

Games in Messaging Applications

In particular embodiments, a messaging system 180 (independently or in cooperation with a social-networking system 160) may provide a dedicated games-tab element on a messaging application for the discovery of games. A user may be able to access the messaging application through a client system 130 connected to a network. On interacting with the games-tab element, a games tab may be shown comprising a dynamic list of games that is constantly updated as the user interacts with one or more games in the list. The games tab can initially provide a simple list of games (e.g., for first time users), but can be iteratively transformed into a more customized list that includes both games recently interacted with by the user and game data for each of these games (including, for example, message threads, total players playing, friends playing the game, last moves, current scores, challenges, recent messages from other players/bots, etc.).

In particular embodiments, the messaging system 180 (independently or in cooperation with the social-networking system 160) may enable game developers to establish a direct relationship between users/players and games inside message threads on the messaging application with the help of programmable game channels (also interchangeably referred to herein as game bots). The messaging system 180 may enable the use of these game bots in the messaging application by providing an application programming interface (API) to the game developers. A game developer may use the API to design a game bot that may automatically send one or more messages and/or updates to a user in a message thread based on his interactions with the game. As an example and not by way of limitation, the game bot may send a welcome message when a user plays his first game, options to challenge friends, announcements of new releases and/or game features, etc.

In particular embodiments, the messaging system 180 (independently or in cooperation with the social networking system 160) may provide gameplay threads that allow users to take in-game actions from within their message threads. Using a gameplay message thread, a user may be able to play a game with other users and see game status information from within the message thread without having to go to the game directly and leaving his messaging application. The messaging system 180 may allow a game developer to send customized messages in a message thread. A customized message may include customizable text and button(s), user photo, an interactive screenshot of the game, etc. The screenshot in the customized message is interactive meaning that when a user interacts with the screenshot, a short video preview of the other user's gameplay could be shown, and then a message allowing a follow-up action could be sent to the user. Also, the text/button associated with the screenshot may be customized (e.g., button "Play" may be customized to say "Challenge" or "Join the game", etc.).

Games Tabs

A user on the messaging application may sometimes have difficulty in finding a desired game as there may not be a dedicated games-tab element for accessing a list of games. Even when a list of games is present, the list may not be sorted in a manner useful to the user (e.g., based on user preferences, past interactions, recency, challenges associated with a game, social interactions with other users, etc.). In particular embodiments, the messaging system 180 may provide a dedicated games-tab element on the messaging application which a user can access through the client system 130. For example, the client application 132 may be the messaging application that works in conjunction with the messaging system 180 via a network (e.g., the network 110) to provide functions/services discussed herein. Upon interacting with the games-tab element, a games tab comprising a list of games or references to games (e.g., titles/name strings of games, images/icons associated with the games, etc.) may be shown to the user, as shown for example in FIG. 6A. When the user interacts with the games-tab element for the first time, a games tab may show a simple list of games sorted based on local/global popularity of the games (e.g., see FIG. 6A). For example, the list may include a module for globally popular games, a module for games played by friends, and a module for promoted games. The list of games may be sorted based on one or more criteria. The one or more criteria may include the user's activity on his or her newsfeed (e.g., the user watched a movie relating to a game, the user viewed or shared posts relating to a game), friends of user playing certain games, etc.

When the user selects a game from the list, the messaging system 180 may direct the user to a message thread within the messaging application where a game bot may welcome the user on starting his first game (discussed further below). The game bot in the message thread may send messages to the user to keep him engaged with the game. The game bot may suggest other users/players to the user for a multiplayer game session in the same message thread within the messenger application using a gamer graph (see FIG. 5) of the user. In some embodiments, the user may be able to invite other players that the user wants to play with in the same message thread or in other message threads. As the user plays the game (e.g., solo or with other users), the message thread(s) get populated with messages from the game bot and/or the other users. These messages may include, for example, user scores, challenge(s) received from other users, game status, other users' status or performance metrics (scores, ranks, levels, etc.) with respect to the game, user's standing locally (i.e., where does the user performance stands compared to his friends/invitees/challengees in the game), user's standing globally (i.e., where does the user stands compared to other user playing the game around the world), new game levels, updates regarding the game, etc.

In particular embodiments, when the user plays a game, the messaging system 180 may collect game data and incorporate that data in the games tab. The game data may include, for example, the message threads containing messages from the game bot and/or the other users in order of recency, pending challenges in the game, user scores, other users' performance (e.g., scores) compared to the user, total number of users playing the game, etc. Incorporating game data into the games tab may be advantageous as the next time the user interacts with the games-tab element, the user may see all the game-related information (e.g., message threads, scores, friend's performance, pending challenges, prizes/awards received, total number of user playing the game, etc.) and links to message threads containing social conversations at one place, as shown for example in FIG. 6B. When the user selects a particular link, the user may be directed to the message thread associated with the link where he can again initiate a game session with the parties involved in that thread.

In particular embodiments, the messaging system 180 may perform the above process of incorporating the game data into the games tab for each game and/or for each instance of the game that the user interacted with. The messaging system 180 may rank the list of games for display in the games tab to a user. In particular embodiments, the messaging system 180 may rank the list of games played/interacted by the user based on one or more criteria. The one or more criteria may include, for example and not by way of limitation, a recency of interaction with the games by the user, engagement level of the user with the games (i.e., how active is the user playing or interacting with the games), social-network activity of the user (e.g., posts, endorsements, etc.) relating to the games, etc.

In particular embodiments, the messaging system 180 may rank the list of games using a gamer graph 186 associated with the user, as discussed above in reference to at least FIG. 5. The gamer graph 186 may represent games and players/users as nodes, connected by edges within the graph, similar to a social graph. The gamer graph 186 may be used to determine a "game affinity" for a first user with respect to a second user based on the degree-of-separation within the graph, as well as other interactions, such as user frequency of interaction with that game, with other users, etc. The information reflected in the gamer graph 186 may be used to assign the ranks and sort the list of games accordingly.

In particular embodiments, the messaging system 180 may rank one or more message threads for associating with each game for display in the games tab. The messaging system 180 may rank the message threads based on one or more criteria. For example, a criterion for ranking the message threads may include a recency of messages between users in the message threads (i.e., how recent the messages were exchanged between two or more users in a message thread). Message threads containing recent messages may be given more priority compared to other message threads and may be placed on top in the games tab. As another example and not by way of limitation, the criterion for ranking the message threads may include a strength or type of relationship between participants/users in the message threads. For instance, message threads having participants who are friends/family or have a first degree of relationship may be ranked better or given more priority relative to other message threads having participants with second or third degree of relationship. In particular embodiments, the messaging system 180 may use a gamer graph 186 to determine the strength or type of relationship between users in the message threads. For instance, edges 506 in the gamer graph 186 may indicate how two users are connected with each other or their degree of separation. Also thickness/boldness level of an edge 506 may indicate how strongly the two users are connected. For example, bold edges may indicate a stronger bond between the two users as compared to thin edges, as shown in FIG. 5.

In particular embodiments, the messaging system 180 may make use of a machine-learning model to assign a rank to each game and message thread(s) associated with the game, and then use the ranking to sort the list of games and message threads for display in the games tab. For example, the model can constantly learn the user's behavior as he interacts with the games and then rank the games based on how active the user is with those games. By way of an example, if user and his friends are most active with the game of "Pacman", then "Snake", and then "Battlefield", the model may assign a rank 1 to "Pacman", a rank 2 to "Snake", and a rank 3 to "Battlefield" so that the user may see "Pacman" on the top, then "Snake", and then "Battlefield". In some embodiments, the machine-learning model may assign this ranking based on the recency of social conversations reflected in the message threads associated with the games. For example, if the last messages exchanged between the user and other user(s) are for the game of "EverWing", then the model may assign a rank 1 to that game and keep that on the top of the games list. In some embodiments, the machine-learning model may assign different ranks to games based on a likelihood or probability of user likeness/preference towards a game. For example, if there are fifteen message threads associated with the "Pacman" game, nine message threads with the "Slope Slider" game, and one message thread with the "EverWing" game, then this may indicate that the user has certain preference or likeness towards the "Pacman" game. The model may use this indication to assign ranks to the games accordingly.

In particular embodiments, the messaging system 180 (or the machine-learning model of the messaging system 180) may update the games tab at periodic time intervals or in real-time to reflect a revised games listing and one or more message threads for each game. For example, the messaging system 180, at certain time intervals (e.g., certain hours, days, weeks, etc.), determines games that have been interacted by a user and message threads that are involved with those games. The messaging system 180 may rank the interacted games and the message threads based on criteria discussed above. Once ranked, the messaging system 180 may send instructions to the client application 132 (e.g., messaging application) to display the updated games tab comprising the games and message threads associated with each game in the ranked order to a user of the client system 130.

In particular embodiments, the messaging system 180 in cooperation with the messaging application may provide a games-tab element for display to a user if the user is an active gamer or meets a certain threshold of gaming activity. For example, the messaging system 180 may determine whether the user interacted with one or more games (e.g., played/viewed games, observed gameplay of other users, liked game(s), etc.) more than a threshold number of times before it displays a games-tab element to the user. As an example and not by way of limitation, the games-tab element may be provided to users that have played games at least ten times, so if the user played the "Snake" game five times, "Pacman" game three times, and "EverWing" two times, then the user may be considered as an active gamer and the games-tab element may be shown to the user in the messaging application. As another example, the games-tab element may be provided to users that have interacted with a messaging thread at least once, so if the user is involved in a message thread observing gameplay of two other users involved in the thread playing "Chess" then the user may be considered as an active game observer and the messaging system 180 may use this information to display the games-tab element to the user. In particular embodiments, the messaging system 180 may determine whether the user is an active gamer/observer or if the user meet the threshold of gaming activity based on the user's gamer graph. For example, as shown in FIG. 5, the edges associated with the gamer "C" (gamer node 502) indicate that C played the "Endless Lake" game, endorsed the "Pacman" game on his newsfeed, liked the "Battlefield" game, and observed the gameplay of friends in "Snake" game. The messaging system 180 may use this information to determine that "C" is an active gamer. As another example, the bold edge connecting the node 504 associated with gamer "S" and node 504 associated with game "Snake" may represent a strong connection between the two nodes, which may indicate that "S" has played the game many times and the messaging system 180 may use this information for the determination. In some embodiments, the messaging system 180 may make the determination based on a measure of game affinity of a user with respect to one or more games as discussed elsewhere herein.

Figure 6:
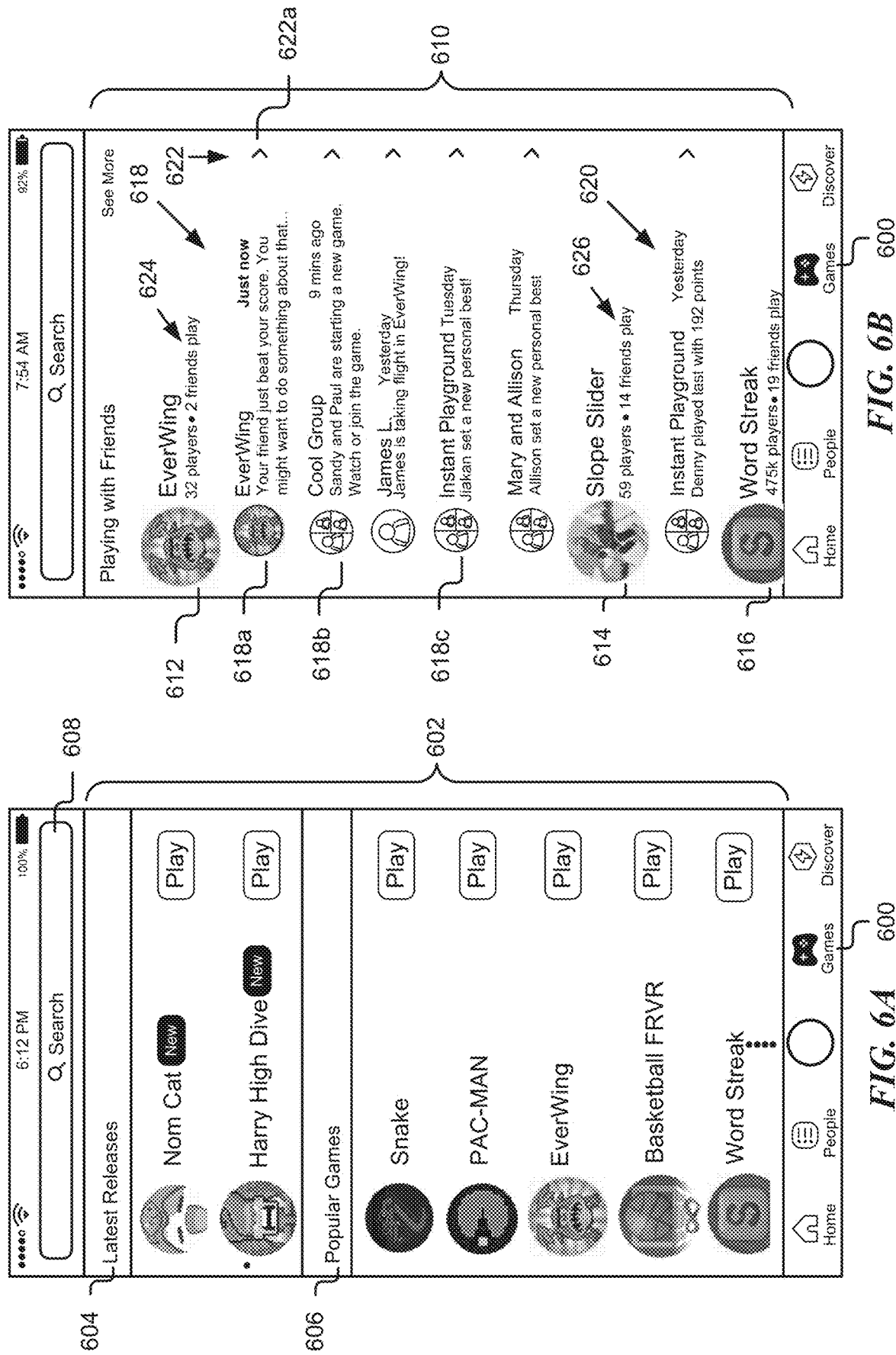
FIG. 6A is a graphical user interface showing an example games-tab element on a messaging application.
FIG. 6B is a graphical user interface showing an updated games tab containing a refreshed list of games once a user interacted with one or more games.

In particular embodiments, the messaging system 180 may provide a games tab containing an initial list of games (see FIG. 6A) to all users whether the users are active gamers/observers or first time users without any gaming activity in the past. In particular embodiments, the messaging system 180 may provide the games listing as shown in FIG. 6B containing an inbox of gaming activities to a user only when a user has interacted with one or more games a certain number of times as discussed above. It should be noted that other ways of presenting the games tab to a user are also possible and are within the scope of the present disclosure.

FIGS. 6A and 6B show an example scenario of a transition from a simple list of games (i.e., for first time visitors)

to a customized inbox of game activities as discussed above. In particular, FIG. 6A is a graphical user interface showing an example games-tab element 600 on a messaging application. Upon interacting with the games-tab element 600, a user may see a games tab 602 containing an initial list of games, which as depicted includes a "Latest Releases" section 604 on the top showing some newly released games and a "Popular Games" section 606 showing some popular games. The user may be able to scroll down through the list to view more games with the help of a scroll bar, arrow buttons (e.g., down arrow) on the user's device, or just by swiping up with his finger. It should be noted that this list is shown for example purposes and may include other games and/or sections as discussed elsewhere herein. For example, the games tab 602 may include games based on user activity on his newsfeed, friends of user playing certain games, user interactions with some previous games, etc. The user may also be able to search a game of his choice through a search tab 608. Upon getting a search query of the user in the search tab 608, the list may be updated to reflect the desired game choice. The list of games may be dynamically updatable as the user interacts with more and more games and to incorporate game data with each interacted game, as discussed below with respect to FIG. 6B.

FIG. 6B is a graphical user interface showing an updated games tab 610 containing a refreshed list of games once the user interacted with one or more games. As depicted, the updated games tab 610 includes references to at least games 612, 614, and 616 along with game data associated with each of these games. For example, the referenced games 612 and 614 include message threads 618 and 620, respectively, containing conversations that the user had with other user(s) regarding these games, message(s) from each of these games itself, and information reflecting game activity. The message threads for each game are shown in the order of recency. Also, each of these message threads are arranged such that the message thread shows the most relevant information to the user. The information may be relating to the game. For example, the message thread 618 from the game indicates to the user that his friend just beat his score. As another example, message thread 618b containing conversations between the user and his friends in a group named "Cool Group" indicates to the user that his friends Sandy and Paul are stating a new and if the user wants to watch or join the game with them. Yet as another example, the message thread 618c having a group conversation between the user and his friends in a group named "Instant Playground" indicates to the user that "Jiakan set a new personal best" in the game 612. The user may go to a desired message thread to view the complete conversation, resume his conversation, and/or take a game action via links 622. For example, the user may go to the message thread 618a by interacting with a link 622a.

Also, in the graphical user interface of FIG. 6B, player/friend statistics are provided for display along with each game. For example, the game 612 includes player/friend statistics 624 that indicate to the user that thirty-two total players and two of the user's friends are currently playing the game 612. As another example, the game 614 includes player/friend statistics 626 that indicate to the user that fifty-nine total players and fourteen of the user's friends are currently playing the game 614.

Figure 7:
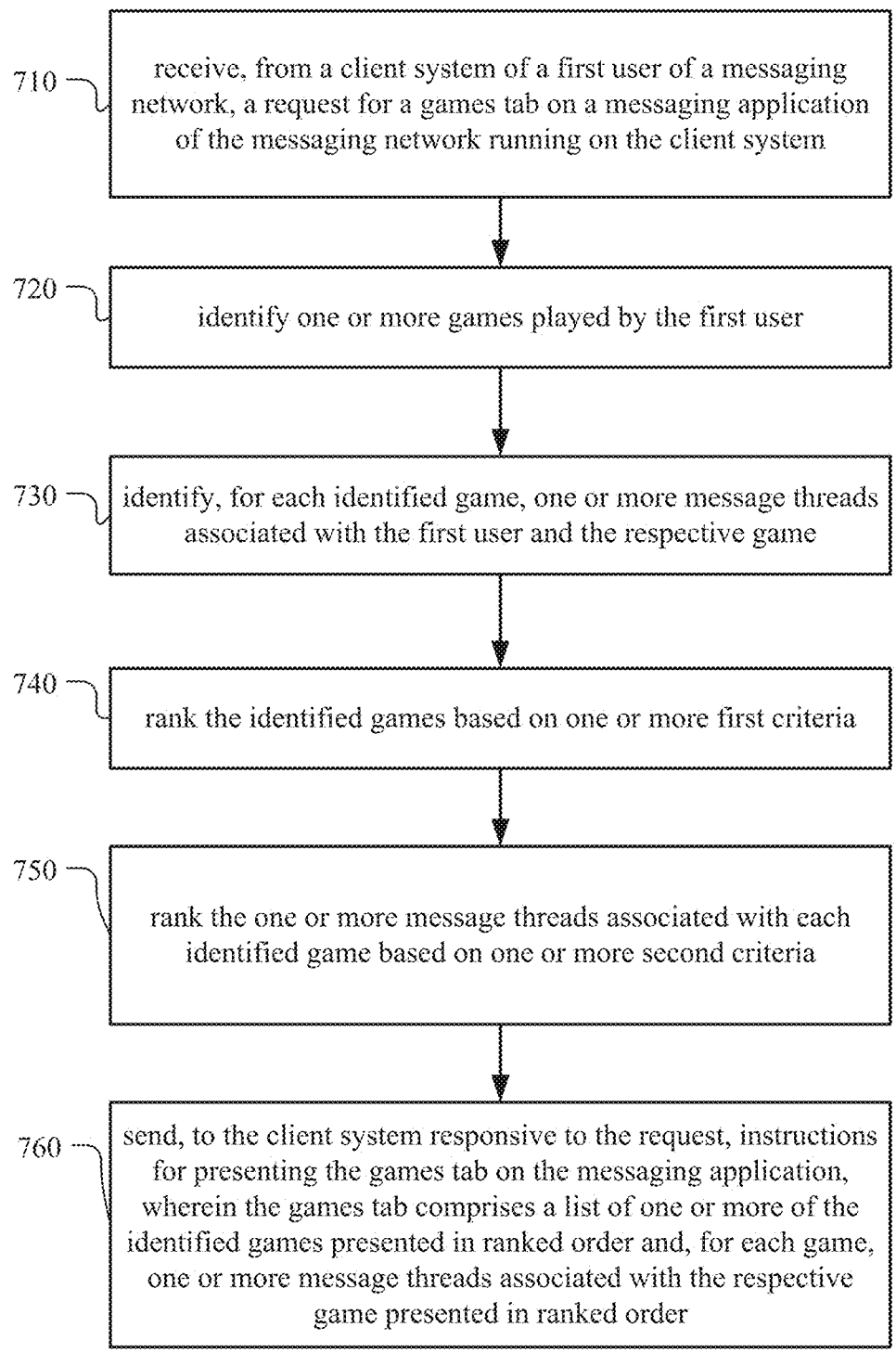
FIG. 7 is a flowchart of an example method for presenting a games tab on a messaging application associated with a messaging system.

FIG. 7 is a flowchart of an example method 700 for presenting a games tab on a messaging application associated with a messaging system 180. The method 700 may begin at step 710, where the messaging system 180 may receive, from a client system 130 of a first user of a messaging network, a request for a games tab on a messaging application (e.g., the client application 132) of the messaging network running on the client system 130. At step 720, the messaging system 180 may identify one or more games played by the first user. In particular embodiments, the messaging system 180 may use a gamer graph (e.g., the gamer graph 186) associated with the first user to identify the one or more games played/interacted by the first user, as discussed elsewhere herein. At step 730, the messaging system 180 may identify, for each identified game, one or more message threads associated with the first user and the respective game. At step 740, the messaging system 180 may rank the identified games based on more first criteria. The one or more first criteria may include, for example and without limitation, a recency of interaction with the games by the first user, a measure of engagement of the first user with the games, a measure of social-network activity (e.g., posts, endorsements, shares, etc.) of the first user relating to the games, a measure of game affinity of the first user with respect to one or more of the identified games, etc. At step 750, the messaging system 180 may rank the one or more message threads associated with each identified game based on one or more second criteria. The one or more second criteria may include, for example, a recency of messages between users in the message threads, a strength or type of relationship between users in the message threads, etc. At step 760, the messaging system 180 may send, to the client system 130 responsive to the request, instructions for presenting the games tab on the messaging application, wherein the games tab comprises a list of one or more of the identified games presented in ranked order and, for each game, one or more message threads associated with the respective game presented in ranked order (as shown for example in FIG. 6B). Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for presenting the games tab by ranking games and message threads associated with each game including the particular steps of the method of FIG. 7, this disclosure contemplates any suitable method for presenting the games tab including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7. For example, the steps of the method 700 may be performed by the messaging system 180 independently or by a combination of the messaging system 180 and the social-networking system 160.

Game Channels

In particular embodiments, the messaging system 180 may enable game developers to establish a direct relationship between a player and a game with the help of a programmable game channel (herein referred to as a game bot), which may be a software code, logic, or routine that interprets user actions and responds accordingly. The messaging system 180 may enable the use of these game bots in its applications (e.g., messaging application) by providing an application programming interface (API) to the game developers, as shown for example in FIG. 3B. The game developers may be associated with a game-managing system, such as the game-managing system 190. The API may link one or more applications of the messaging system 180, such as the messaging application, with the game-managing system 190 to allow the game-managing system 190 to perform activities on the messaging application. For example, a game developer associated with the game-managing system 190 may use the API of the messaging system 180 to design a game bot that automatically interacts with a user in a message thread when the user interacts with a game. The messaging system 180 may integrate the game bot as part of its messaging environment so that the game bot may be able to interact with a user in a message thread.

Figure 8B:
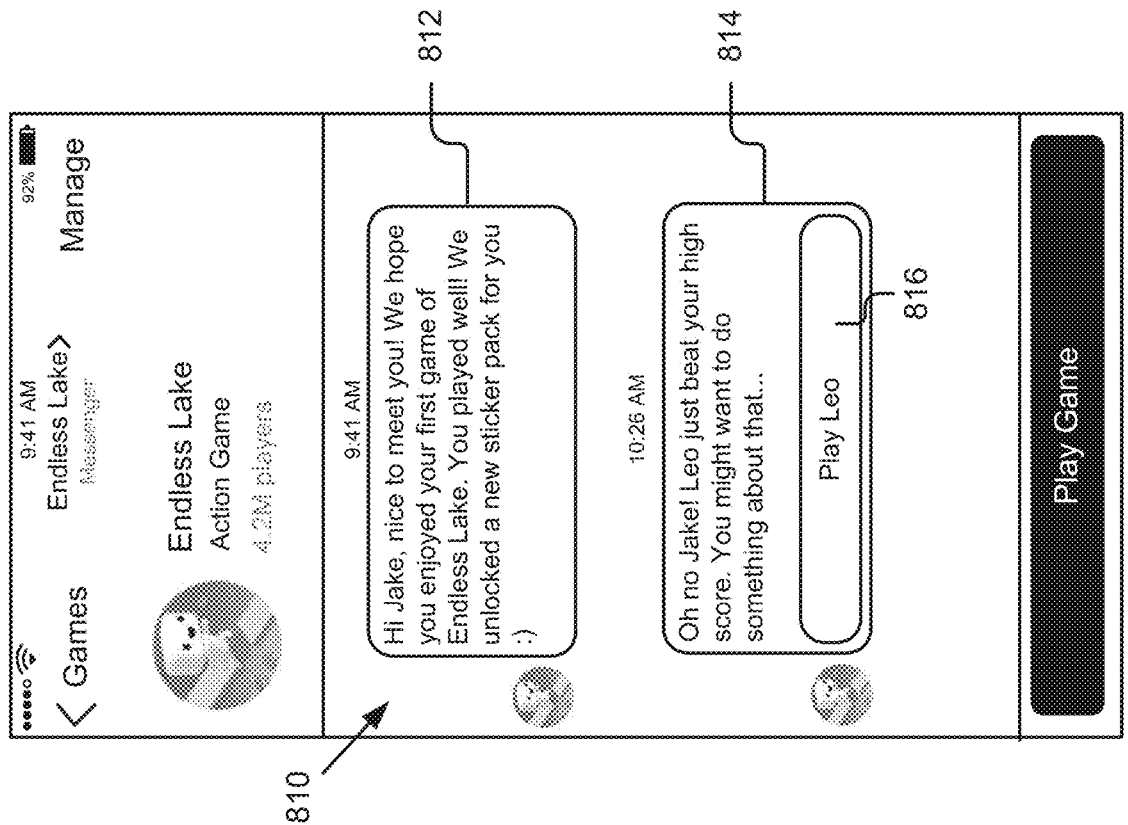
FIG. 8B is a graphical user interface showing an example message thread containing messages that may be sent by a game bot.
Figure 8A:
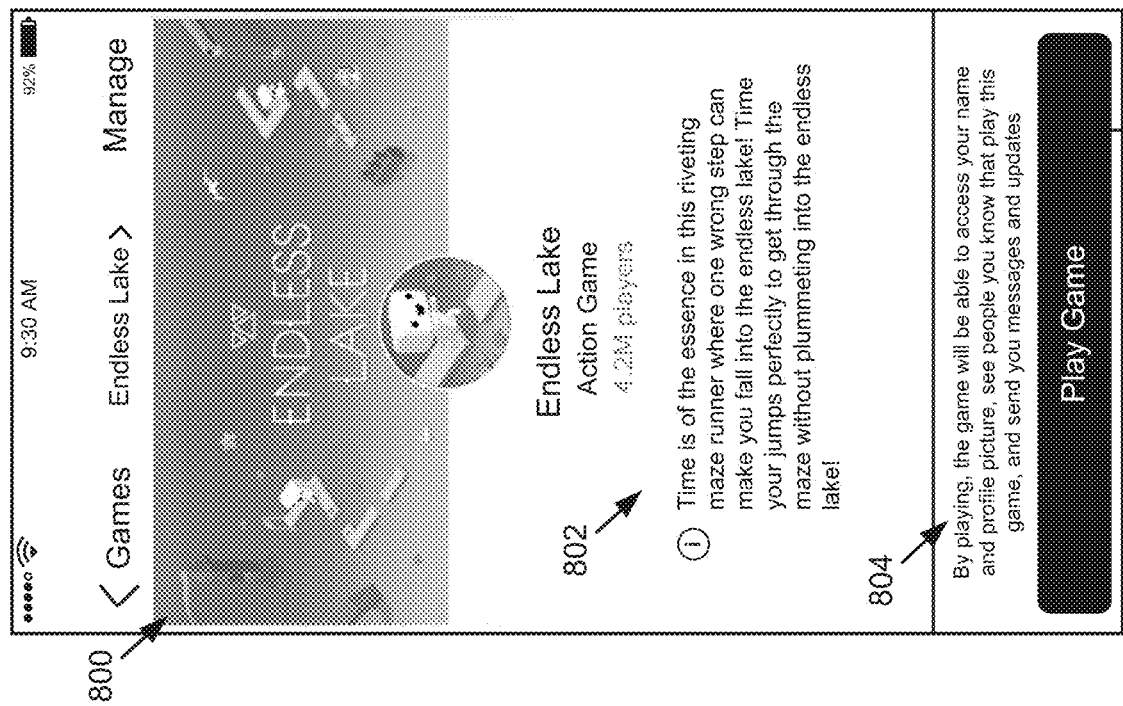
FIG. 8A is a graphical user interface showing an example welcome page when a user requests a first time access to a game.

When a user is about to play his first game, the messaging application (e.g., the client application 132) may notify the user that one or more of his name, profile picture, social graph, gamer graph, etc. will be shared with the game (subject to the user's privacy preferences) and the game can send messages and/or updates to the user in a message thread (as shown for example in FIG. 8A). In other words, when the user accepts a game, the user may also accept permissions to receive messages from the game bot. Upon receiving an acceptance to start the game, the messaging application may share a user ID and a game ID associated with the game with a game bot. In particular embodiments, a hashed version of the user ID (or other suitable anonymizing identifier) may be shared with the game bot such that user information is unique, secured, and remain anonymous (in order to protect the privacy of the user from the game). Any standard cryptographic hash techniques/algorithms may be applied for generating the hashed ID for the user. Some of the cryptographic hash algorithms may include, for example, message digest 5 (MD5), secure hash algorithm (SHA), etc. Once the hashed user ID is shared with the game bot, the game bot may request the messaging system 180 to initiate a message thread on the messaging application where the game bot can send messages and/or updates associated with the game in the message thread. The game bot may send messages and/or updates, via the messaging application, to engage the player in the game. There may be a two-way communication flow between the user and game i.e., (1) user to the game—when a user interacts with the game from inside the messaging application, and (2) game to the user—when the bot sends the user game-related messages via the messaging application. The game-related messages may include, for example, welcome message when the user first plays the game, information regarding other users (e.g., friends) who played the game, options to challenge other users (the game bot may suggest these other players using the player's gamer graph), updates regarding how other users are doing in the game (e.g., information regarding game achievements, scores, leaderboard status), announcements of new releases, game features and/or levels, rewards and special prizes based on the user's performance in the game. In particular embodiments, a games tab on the messaging application of the user may be updated in real-time or at periodic time intervals to incorporate the message thread containing messages between the user and the game bot with the game.

In particular embodiments, the game bot may run in the background of the game and analyze in-game actions of the user for sending messages. The in-game actions may reflect how the user is doing inside the game, i.e., his performance metrics (e.g., score, rank, level achieved) and/or status. Based on the analysis, the game bot may send one or more messages to the user in the message thread. For example, an in-game action may include user achieving a score of 150 in the game of "Words with Friends", and the game bot may analyze this action and follow-up with the user by sending a message "Hey, good job! You just scored a 150 in your game of Words" in a message thread. In particular embodiments, the game bot may send messages to the user in the message thread using a detect-event function for detecting events and an input-event function for sending messages to the user based on the detected events. Once an event is detected, it may automatically trigger the input-event function of the game bot to send a message to the user. For example, when the game bot detects that a user "Tom" achieved a all-time high score in the "Temple Run" game, the game bot may interact with Tom in the message thread by sending a message "Hey Tom, that was an impressive game. You just achieved a all time high score of X". As another example, if a user "Jake" played his first game of "Endless Lake", then the game bot may initiate interaction with Jake by sending a message saying "Hi Jake, nice to meet you! We hope you enjoyed your first game of Endless Lake." (as shown for example in FIG. 8B).

In particular embodiments, the game bot may send a message to the user using a mapping between the detected events and corresponding responses defined at the game-managing server 190. The mapping may indicate for each type of event, what message should be delivered. These messages may be predefined by the game developer/game admin associated with the game-managing server 190. For example, for an event type "New Game Levels", a message may be predefined such as "Good news! We have just released X new levels. Try them out!", where X is the number of levels that are released in the game. In this example, the detect-event function triggers the input-event function to look up the mapping and send a message corresponding to the "New Game Levels" event type.

In particular embodiments, the game-managing system 190 may detect game events and once one or more of these events are detected, the game-managing system 190 may make an API call to the messaging system 180 providing the detected events, which the game bot may then use to send an appropriate message to a user in a message thread. For example, the game bot may receive an event detected by the game-managing system 190, compares the received event to the mapping (discussed above) and identifies an appropriate message corresponding to the event for sending to the user.

Figure 8C:
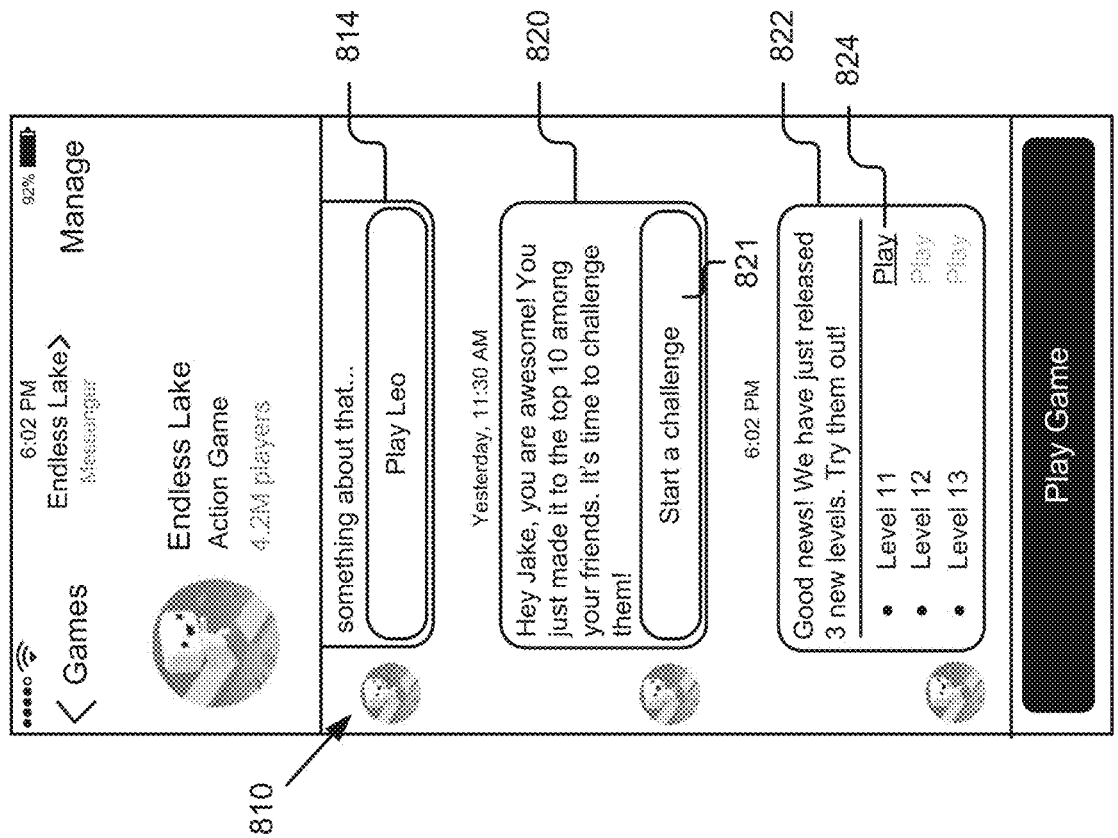
FIG. 8C is a graphical user interface showing the same message thread with some additional messages sent by the game bot.

Alternatively, the game bot may be capable of detecting a variety of events by itself and sending messages based on these events. For example, an event may be how the user is doing inside the game. The game bot may detect this event by using techniques, such as screen-scraping (capturing the image on the screen and parsing it to look for things like current user status, score, rank, user name, game level/stage, time clock, etc.), memory monitoring (monitoring the state of a game by inspecting the game's memory space), packet analysis (intercepting the game's data packets as they are sent/received), etc. As another example, an event may be how other users or friends of the user are doing with respect to the game. The game bot may detect this event by accessing a social graph 166 (FIG. 4) and/or a gamer graph 186 (FIG. 5) of the user. Yet as another example, an event may be new game updates and/or announcements, such as new game levels (as shown in FIG. 8C).

Figure 11B:
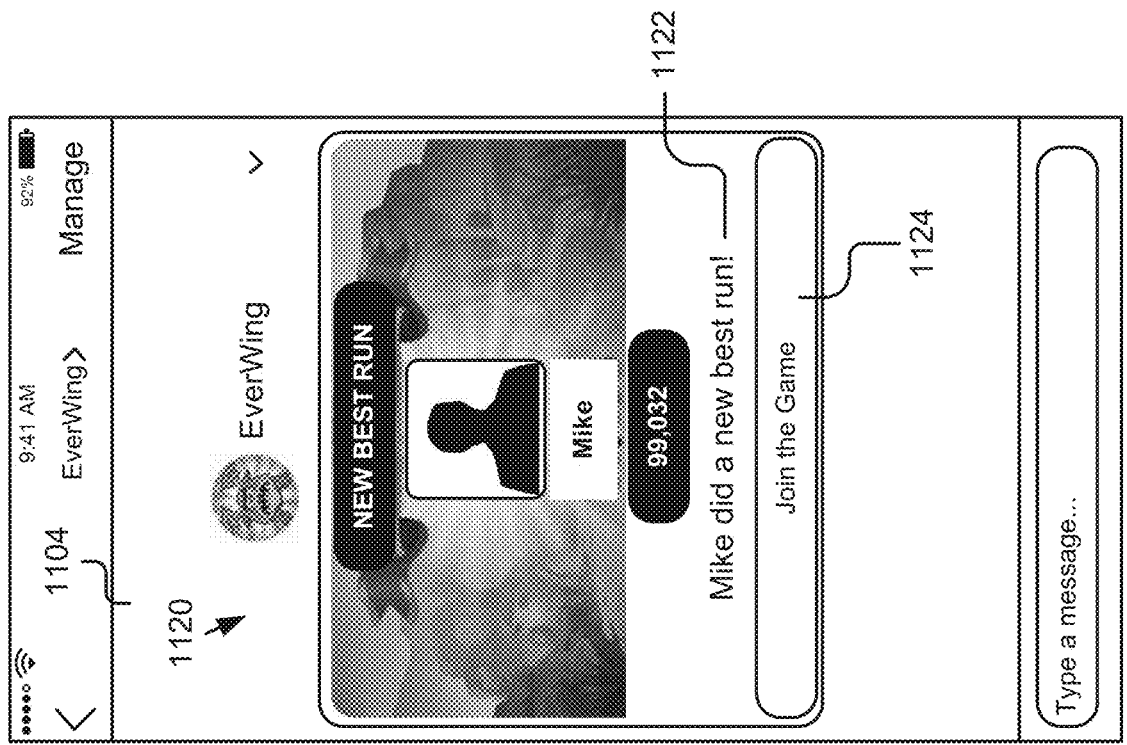
FIGS. 11A and 11B are graphical user interfaces showing example customized messages that may be sent by a game bot in a message thread for a game.
Figure 11A:
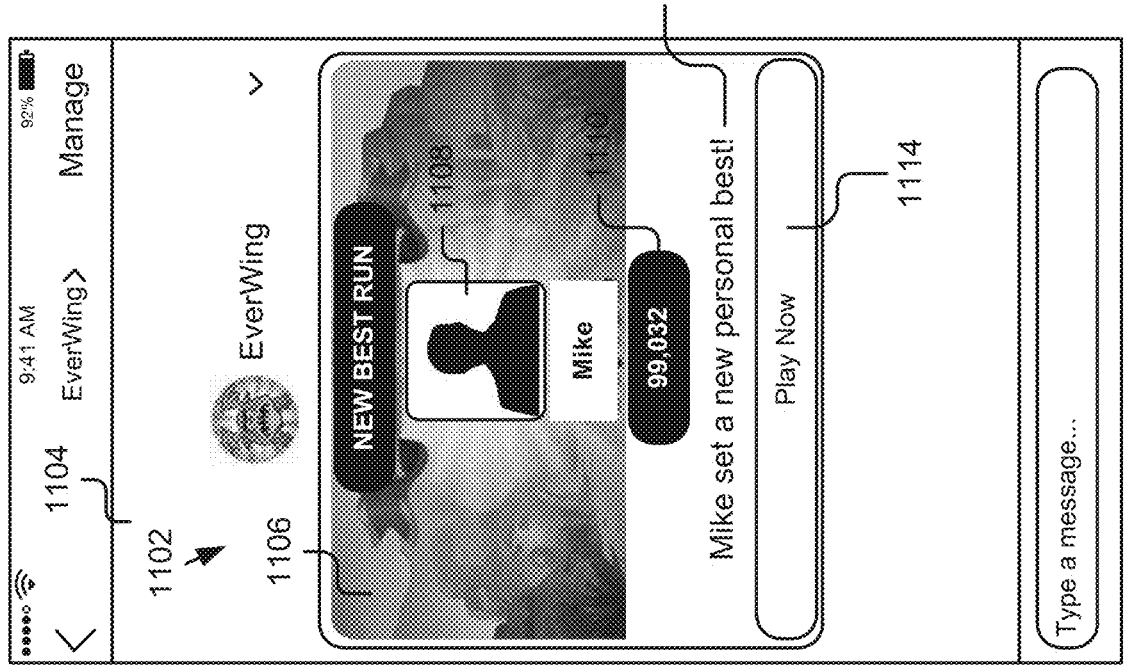

In particular embodiments, the game bot may send customized screenshots/messages/buttons to the user (as shown for example in FIGS. 11A and 11B). A customized message may include, as an example and not by way of limitation, one or more of an interactive game screenshot that, when interacted by the user, shows a preview of a gameplay of the user or any other user(s) playing the game; a customizable text indicating a performance of the user in the game, or a customizable action button that when interacted performs an action with respect to the game (discussed further below).

In particular embodiments, the game bot may send messages in the message thread at particular time intervals. The time intervals may be pre-defined by the game developer who designed the game bot. For example, the game bot may be instructed to send messages to the user after each game session, when a friend of user has played the game, there are new updates/releases in the game, etc. As another example, the game bot may be instructed to engage or re-connect with the user after certain time/days have been passed. In some embodiments, there may be a limit on the number of messages that may be sent by the game bot to a user in a message thread. For example, when the user plays his first game then he may receive 5 messages within 10 days, but this limit may be increased to 10 messages if the user plays the game 2+ times within a specified timeframe, and so on. The message limit may be adjustable based on a measure of game affinity of the user with respect to the game.

As discussed earlier, in order to protect user privacy, the messaging application may use unique anonymized identifiers (e.g., hashed IDs, or other anonymized identifiers) to share with a game bot. In some embodiments, the same user may be assigned a different unique ID for each game he is playing (in other words, the messaging application does not use the same unique ID for different games, and different games do not share unique IDs with each other). For example, James's unique ID for the game "Pacman" may be 1111, and for the game "Snake" may be 2121. So every time James play the Pacman game, the game bot will use ID #1111 to send messages to him in the messaging application. Similar to the unique user IDs, unique/hashed identifiers may be used to identify different message threads (which may also be referred to as context IDs). Also, the thread IDs may be anonymized so that the game developer cannot use the actual thread maliciously, e.g., to post spam or other content that may be unrelated to the game. If there is more than one user involved in a particular message thread then a unique group ID (identifying two or more users in the message thread) will be shared with the game bot. The group ID identifies the group of users (e.g., a group of friends) involved in the gameplay in a message thread. For example, users Jack and Jill may have a message thread with thread ID 4727 associated with the game Pacman with group ID 3333, and users Jack, Larry, Moe, and Curly may have a message thread with thread ID 8236 associated with the game Battlefield with group ID 3434. So there is 1:1 association between the different entities involved in a game session, i.e., a particular user or group of users (user ID or group ID) maps to a particular game (game ID) which maps to a particular message thread (context ID).

In some embodiments, the game bot may engage one or more additional users (second users) in a message thread. The game bot may identify these second users by accessing a social graph 166 (FIG. 4) or a gamer graph 186 (FIG. 5) associated with a first user engaged in the game. For example, using the gamer graph 186, the game bot may identify edges connecting the first user and one or more second users to the game. Once these second users are identified, the game bot may determine how these second users are performing and may send a message to the first user in the message thread indicating performance metrics of these second users relative to the first user. In some embodiments, the game bot may send an option to the first user to play against an identified second user as shown for example by the message 814 in FIG. 8B. In response to the option, the messaging application may receive an indication from the first user to play against the identified second user. The messaging application in cooperation with the messaging system 180 may send this indication to a client system 130 associated with the identified second user. If the identified second user accepts the user request, the messaging system 180 may generate a context ID that identifies a message thread for messaging the first and second users. The messaging system 180 may provide this context ID to the game bot, which may then use it to send one or more messages to the first and second users in the message thread.

FIG. 8A is a graphical user interface showing an example welcome page 800 when a user requests a first time access to a game. The welcome page 800 contains a brief description 802 about the game; game bot access notification 804 indicating to the user that his name, profile picture, and social information (e.g. from a social graph) will be shared with the game, and that a game bot will be able to send messages and updates; and a link 806 to start the game.

FIG. 8B is a graphical user interface showing an example message thread 810 containing messages that may be sent by a game bot. As depicted, the game bot may send a message 812 when a user plays his first game. The game bot may send a message 814 when someone (e.g., a friend) outperforms the user and an option 816 to play back.

FIG. 8C is a graphical user interface showing the same message thread 810 with some additional messages 820 and 822 sent by the game bot. The game bot may send the message 820 when the user achieved a certain status (e.g., a position in top 10) and an option 821 to challenge his friends so as to encourage social gameplay. The game bot may send the message 822 when there are any new updates or releases to the game. For example, the message 822 notifies to the user that there are 3 new levels released in the game along with a link 824 to go to a new level.

Figure 9:
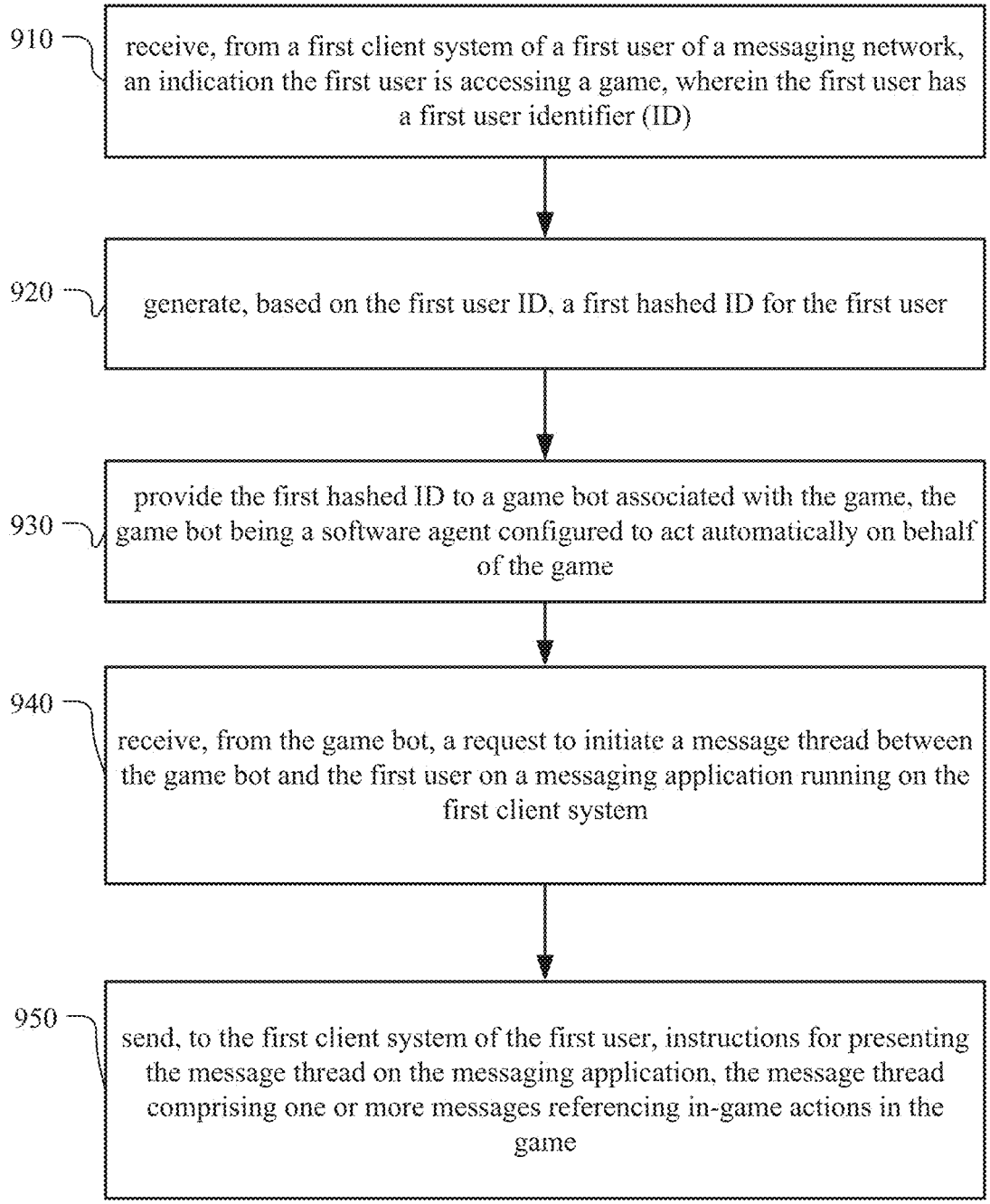
FIG. 9 is a flowchart of an example method for initiating a communication between a user and a game inside a message thread on a messaging application with the help of programmable game channels (or game bots).

FIG. 9 is a flowchart of an example method 900 for initiating a communication between a user and a game inside a message thread on a messaging application with the help of programmable game channels (or game bots). The method 900 may begin at step 910, where the messaging system 180 may receive, from a first client system 130 of a first user of a messaging network, an indication the first user is accessing a game, wherein the first user has a first user identifier (ID). In particular embodiments, the messaging system 180 may provide a games-tab element on a messaging application running on the first client system 130 and the first user may access the game from a games tab (comprising a list of games) that is resulted upon interacting with the games-tab element (as discussed above in section "Games Tabs"). In some embodiments, the games-tab element may be presented based on the first user meeting a threshold level of gaming activity as discussed elsewhere herein. At step 920, the messaging system 180 may generate, based on the first user ID, a first hashed ID for the first user. At step 930, the messaging system 180 may provide the first hashed ID to a game bot associated with the game. The game bot may be a software agent configured to act automatically on behalf of the game. In some embodiments, software logic and/or instructions for the game bot may be defined and added by a game developer to a messaging API associated with the messaging system 180. At step 940, the messaging system 180 may receive, from the game bot, a request to initiate a message thread between the game bot and the first user on a messaging application running on the first client system. The message thread may have a unique thread/context ID associated with the first hashed ID for the first user. At step 950, the messaging system 180 may send, to the first client system 130 of the first user, instructions for presenting the message thread on the messaging application. The message thread may include one or more messages referencing in-game actions in the game. The one or more messages may include, as an example and not by way of limitation, a welcome message welcoming the first user in the message thread in response to the first user playing the game for a first time, performance metrics including a score or a rank of the first user in the game, updates and/or releases in the game, and a customized message (as shown and discussed with respect to FIGS. 11A and 11B). Particular embodiments may repeat one or more steps of the method of FIG. 9, where appropriate. Although this disclosure describes and illustrates particular steps of the method of FIG. 9 as occurring in a particular order, this disclosure contemplates any suitable steps of the method of FIG. 9 occurring in any suitable order. Moreover, although this disclosure describes and illustrates an example method for initiating a communication between a user and a game inside a message thread on a messaging application with the help of game bots including the particular steps of the method of FIG. 9, this disclosure contemplates any suitable method for initiating the communication between the user and the game inside the message thread including any suitable steps, which may include all, some, or none of the steps of the method of FIG. 9, where appropriate. Furthermore, although this disclosure describes and illustrates particular components, devices, or systems carrying out particular steps of the method of FIG. 9, this disclosure contemplates any suitable combination of any suitable components, devices, or systems carrying out any suitable steps of the method of FIG. 9. For example, the steps of the method 900 may be performed by the messaging system 180 independently or by a combination of the messaging system 180 and the social-networking system 160.

Gameplay Threads

In particular embodiments, the messaging system 180 may enable a rich gameplay experience between two or more users associated with a game in a message thread by allowing the user to directly interact with the game via the messaging application. For example, two players can be able to play a game (e.g., take their turns) within a message thread and exchange messages relating to the game without having to leave the messaging application. This can be made possible using a game API from a game-managing system (e.g., the game-managing system 190) and integrating it as part of social conversations on the messaging application.

Figure 10C:
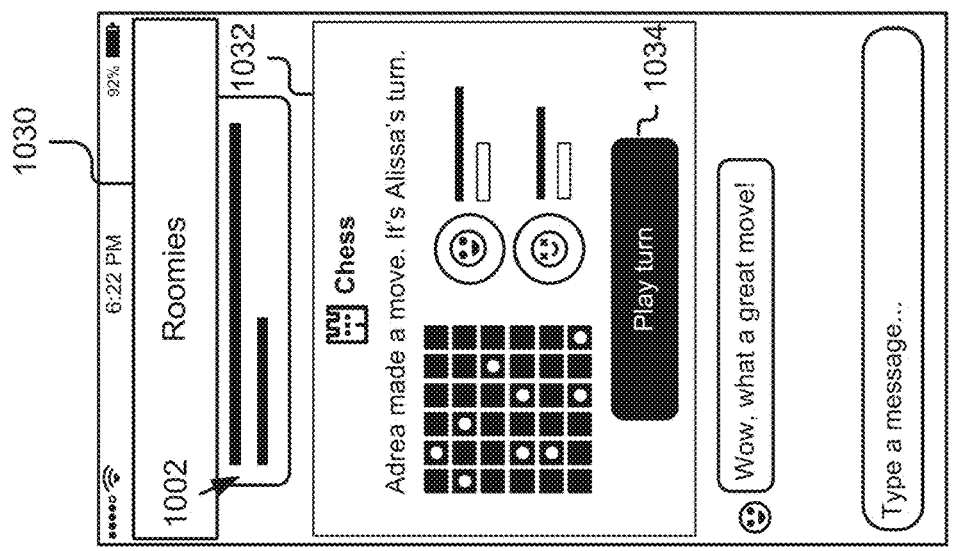
FIGS. 10A-10C are graphical user interfaces showing a live gameplay session between two users from inside a message thread on a messaging application.
Figure 10B:
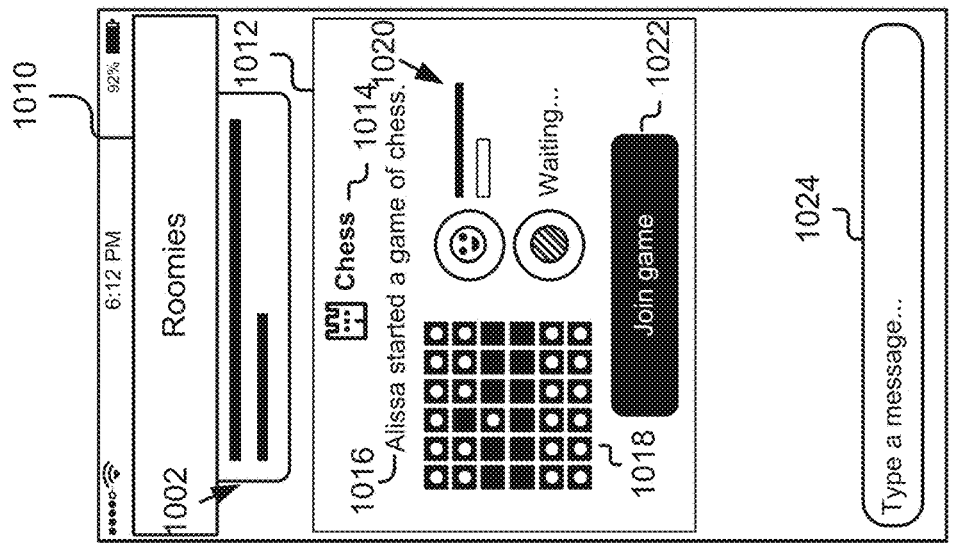
Figure 10A:
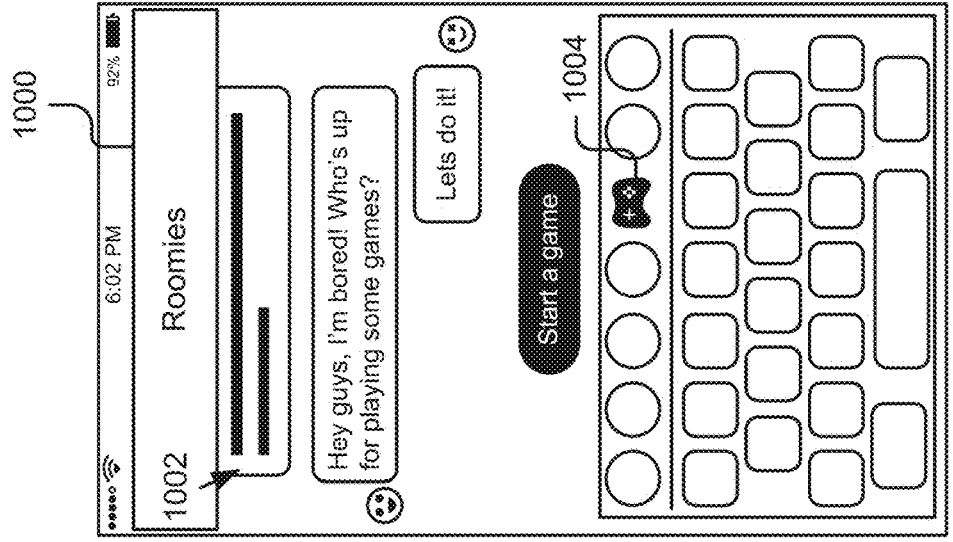

FIGS. 10A-10C are graphical user interfaces showing a live gameplay session between two users from inside a message thread on a messaging application. In particular, FIG. 10A is a graphical user interface 1000 showing a message thread 1002 containing conversations between two users. A first user may be able to start a game with a second user from within the messaging application by clicking on a link 1004. Upon clicking the link 1004, a game window may appear on the first user's screen in the message thread from which the first user may play his first turn (not shown). FIG. 10B is a graphical user interface 1010 that is displayed on the second user's screen to join the game with the first user. The interface 1010 contains the message conversations 1002 and a game window 1012 that contains a game title 1014, status indicator 1016 indicating player status (e.g., who started the game, whose turn it is, etc.), the actual game 1018 with live progress updates, player bar 1020 indicating the players involved in the game along with their current status, and an action button 1022 to take an action with respect to the game. As depicted in the game window 1012, the second user "Andrea" may see that a game of "Chess" has been initiated by the first user "Alissa". Andrea can see the first move that Alissa took in the game. From the player bar, Andrea can see that Alissa is waiting for her to join and a "Join game" button 1022 to join the game and take the first turn. Along with playing the game in the message thread, both the users may be able to send messages to each other in the same thread using a type bar 1024. FIG. 10C is a graphical user interface 1030 that is displayed on the first user's (Alissa) screen when the second user (Andrea) played the last turn. Similar to the game window 1012 discussed above, a game window 1032 is shown on Alissa's screen. Using an action button 1034, in this case "Play turn", Alissa may be able to take her turn. This way the game windows 1012 and 1032 iteratively update as the game progress and both the users may be able to enjoy the game session in the message thread without leaving the messaging application.

In particular embodiments, the messaging system 180 may enable the users playing the game in the message thread to invite one or more other users. For example, the messaging system 180 may provide an option to first and second users who are playing a live game inside a message thread to invite one or more third users to join the game. The messaging system 180, via a messaging application, may receive a request to invite a third user from a client system 130 associated with the first or the second user. The messaging system 180 may send the request to a client system 130 associated with the third user. In response to the third user accepting the request, the messaging system 180 may engage the third user in the message thread with the first and second users. In particular embodiments, the messaging system 180 may generate a context ID that identifies the message thread for messaging the first, second, and third users. The messaging system 180 may provide this context ID to a game bot associated with the game that may then use it to send one or more messages to the first, second, and third users in the message thread. A message may include, for example and not by way of limitation, one or more of an interactive game screenshot that, when interacted, shows a preview of a gameplay of at least the first user or the second user; a customizable text indicating a performance of the first and/or the second users in the game, and a customizable action button that when interacted performs an action with respect to the game. In some embodiments, the game bot may send, to the third user, a message having an option for the third user to either join the game with the first and second users or watch gameplay of the two users in the message thread.

In particular embodiments, the messaging system 180 may enable game developers to customize game-related messages for display in a message thread. The messaging system 180 may do so by providing a messaging application API to the game developers, as shown for example in FIG. 3B. A game developer may add necessary code/logic for the customization feature which the messaging system 180 may then integrate as part of its messaging environment. Once this feature is integrated, the messages and/or buttons that are exchanged between the players are customizable. For example, instead of saying "Play" on the button, it could be customized to say "Challenge" or "Join the Game" or "Make a Move". In some embodiments, this customization may be done by a game bot (discussed above in the "Game Channels" subsection). For instance, the game bot associated with the game may track the game status and/or user performance in the game and send a customized message to a user in a message thread accordingly. In some embodiments, the game bot may use an artificial intelligence technique to generate a customized message.

Figure 12:
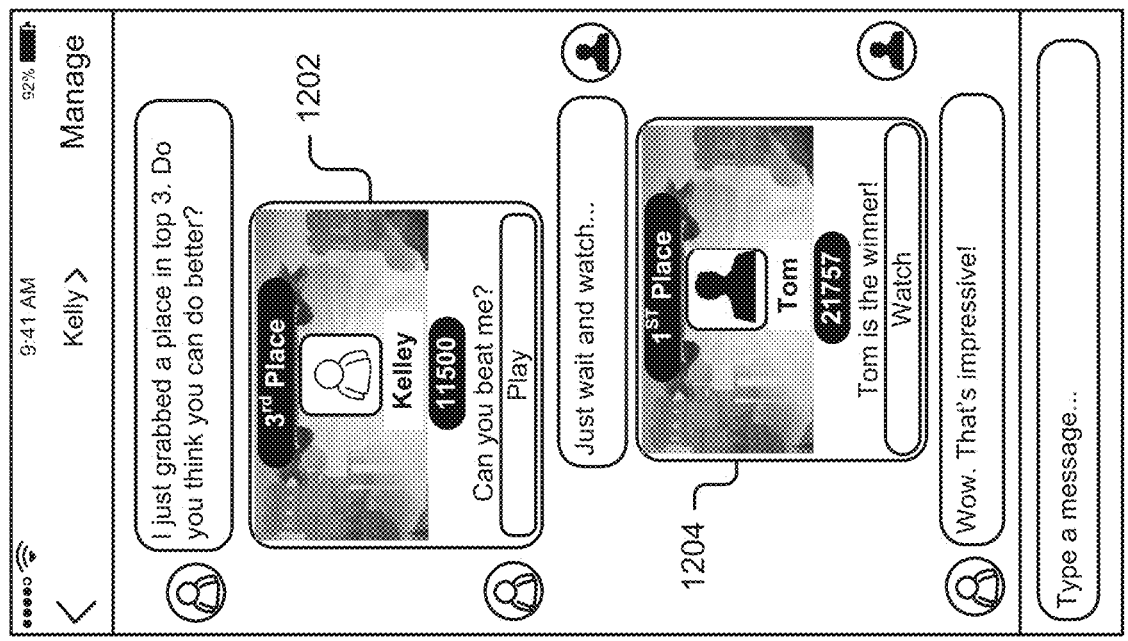
FIG. 12 is a graphical user interface showing example customized messages that may be shared between two users in a message thread.

In particular embodiments, customized messages may be generated for different types of games. The different types of games may include, for example, a solo/single-player game (i.e., where a user/player is playing a game by himself), a multi-player game (i.e., where two or more players play the game with or against each other); a competitive multi-player game (i.e., where two or more players play the game against each other), a collaborative/cooperative multi-player game (i.e., where two or more players are playing together to finish a game), a turn-based game (i.e., where one or more players take actions in turn), a real-time/live-action game (i.e., where one or more players continuous play over time), or other suitable types of games. In a solo/single-player game scenario, a customized message sent to a first player playing a certain game may be, for example, a leaderboard message showing scores/ranks of second players with respect to the first player's score/rank for the game. As another example, a customized message may be a message indicating to a first player that a second player (e.g., first player's friend) set a new personal best in a game and provide an option to play or challenge his friend (see FIG. 11A). In a multi-player game scenario (including a competitive multi-player game), customized messages may be shared between two or more players playing a game (e.g., as shown in FIG. 12). In this scenario, a customized message may show, for example, performance metrics of a player (e.g., score/rank/level in the game), current game status or screenshot, a short preview of the player's gameplay, a profile icon showing a picture of the player, a game icon, and an option to play with or against the player. In a turn-based game scenario, once a first player has taken his turn, a customized message will be presented to a second player in a message thread showing, for example, the first player's current performance metrics, current game status, a short preview of the last turn played by the first player, and an option to take the next move/turn in the game (e.g., as shown in FIG. 10C). A similar customized message may be shown for a real-time/live action game scenario where the customized message may be updated in real-time to reflect the game and player status (see FIG. 10C). In a collaborative/cooperative multi-player game scenario, a customized message may be a message to a user indicating that his friends are playing certain game and provide an option to the user to come join the game and play with his friends to help them finish the game. For example, three players may be fighting a boss in a game and need help, the game bot may send a customized message to a potential fourth player saying "Hey, your friends Leonard, Sheldon, and Howard are having a tough time destroying the alien spaceship in the Battleship game, come and save them!" and provide a button "Join the Game". The game bot may make use of the social graph (FIG. 4) or gamer graph (FIG. 5) to find this potential fourth player and generate the customized message. Also, when two or more players are playing a game (either competitively (i.e., against each other) or cooperatively (i.e., in harmony with each other)), the game bot may send messages to other players (e.g., friends) providing options to either come join the game or view the game in a message thread, as discussed elsewhere herein. For example, a message may be like "Hey come watch Tom and Harry play a game of Chess". It should be noted that customized messages are not limited to the different types of games or scenarios discussed herein, and customized messages for a variety of other scenarios or game types are also possible and within the scope of the present disclosure.

FIGS. 11A and 11B are graphical user interfaces showing example customized messages that may be sent by a game bot in a message thread for a game. In particular, FIG. 11A is a graphical user interface showing a customized message 1102 that may be sent by a game bot associated with the "EverWing" game in a message thread 1104. The customized message 1102 may include an interactive screenshot 1106 of the game, a user photo 1108 that may also be customizable, user performance metric 1110 (e.g., score, rank, etc.), a customizable text 1112, and a customizable action button 1114 (e.g., "Play Now"). FIG. 11B is a graphical user interface showing another example of a customized message 1120 that may be sent by the game bot in the message thread 1104. In the customized message 1120, the original text 1112 "Mike set a new personal best!" has been customized to a different text 1122 to say "Mike did a new best run!". Also, the original action button 1114 "Play Now" has been customized to a different action button 1124 to say "Join the Game". The screenshot 1106 in the customized message 1102 or 1120 may be interactive meaning that when a first user interacts with the screenshot, a short video preview of a second user's gameplay could be shown, and then a message allowing a follow-up action could be sent to the first user.

FIG. 12 is a graphical user interface showing example customized messages 1202 and 1204 that may be shared between two users in a message thread. Similar to the customized message 1102 in FIG. 11A, each of the messages 1202 and 1204 contains an interactive game screenshot which upon interaction shows a short video preview of a user's gameplay to the other user, game performance metrics, a user photo, a customizable text, and a customizable action button. In some embodiments, the text and action buttons may be customized based on predefined rules set by a game developer for the customization. For example, the game developer may define that if a user's rank is in top 5 but not $1^{st}$, then the text could be customized to say one of "Can you beat me?", "Show me if you can do better than this", "Beat this", "Beat my rank", etc. Also, the action button could be customized to say one of "Play", "Make a move", "Take a turn", etc. As another example, for a rank 1 achievement, the game developer may define that the text could be customized to say one of "X is the winner", "X wins the game", "X achieved a trophy on getting the $1^{st}$ rank!", "The winner is X", "Congratulations X, you won the game!", etc. The action button for this case may be customized to say one of "Watch", "Replay", "Rematch", "Play again", etc.

In particular embodiments, the game bot may make use of a random function (e.g., rand( ) to randomly choose a text and action button for a customized message from a predefined set of rules by the game developer for particular scenarios as discussed above. In some embodiments, an action button in the customized message may contain metadata of a player (e.g., player ID, player score, pending challenges, player rewards, last turn, etc.) so when the player interacts with the action button in the message thread, the game responds accordingly (without the user having to actually enter the game app). For example, if Jack is playing "Battlefield" against Jill, the game bot for the game may send a message to Jack indicating it is his turn, and present him with two customized buttons, saying "Attack" and "Defend". Jake could then click the "Attack" button in the messenger thread, causing the appropriate in-game action. Note that game bot can track the current game state, such that if Jack goes back and later hits the "Defend" button, he may get a notification saying "Sorry, it is Jill's turn." Players involved in a conversation in a message thread have the option to either watch the gameplay of other players or join the game.

Figure 13:
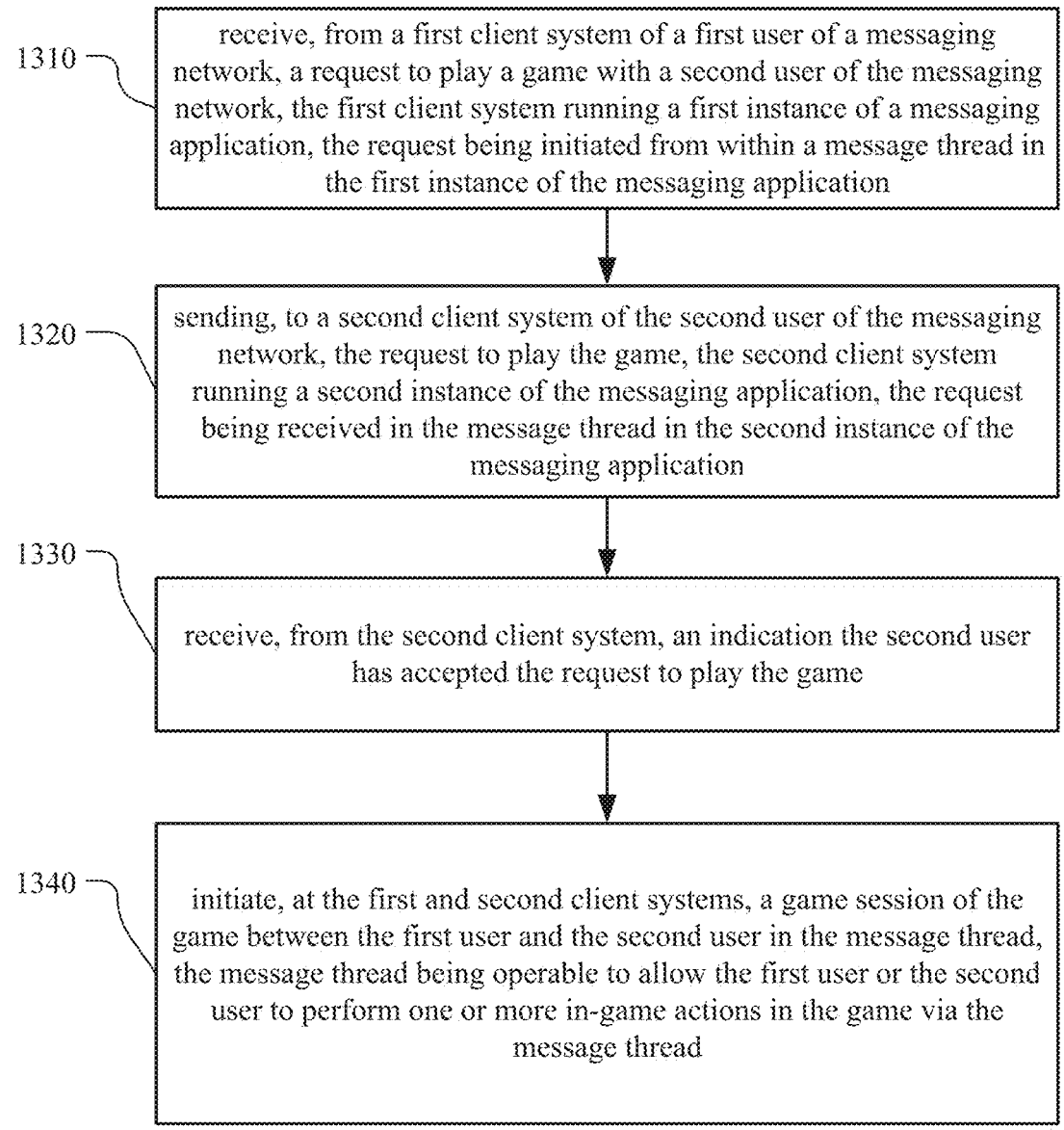
FIG. 13 is a flowchart of an example method for initiating a live game session between two users from within a message thread on a messaging application.

FIG. 13 is a flowchart of an example method 1300 for initiating a live game session between two users from within a message thread on a messaging application. The method 1300 may begin at step 1310, where the messaging system 180 may receive, from a first client system 130 of a first user of a messaging network, a request to play a game with a second user of the messaging network. The first client system 130 may be running a first instance of a messaging application and the request may be initiated from within a message thread in the first instance of the messaging application. In particular embodiments, the messaging system 180 may provide a games-tab element on the first instance of the messaging application and the first user may request access to the game from a games tab (comprising a list of games) that is resulted upon interacting with the games-tab element (as discussed above in the "Games Tabs" subsection). In some embodiments, the games-tab element may be presented based on the first user meeting a threshold level of gaming activity as discussed elsewhere herein. At step 1320, the messaging system 180 may send, to a second client system 130 of the second user of the messaging network, the request to play the game, as shown for example in FIG. 10B. The second client system 130 may be running a second instance of the messaging application and the request may be received in the message thread in the second instance of the messaging application. At step 1330, the messaging system 180 may receive, from the second client system 130, an indication the second user has accepted the request to play the game. At step 1340, the messaging system 180 may initiate, at the first and second client systems 130, a game session of the game between the first user and the second user in the message thread. The message thread may be operable to allow the first user or the second user to perform one or more in-game actions in the game via the message thread, as shown for example in FIG. 10C. The one or more in-game actions may include, for example and not by way of limitation, taking a turn to progress the game (see FIG. 10C), viewing a gameplay of the first user or the second user, sending a message to the first user or the second user, etc. Particular embodiments may repeat one or more steps of the method of FIG. 13, where appropriate. Although this disclosure describes and illustrates particular steps of the method of FIG. 13 as occurring in a particular order, this disclosure contemplates any suitable steps of the method of FIG. 13 occurring in any suitable order. Moreover, although this disclosure describes and illustrates an example method for initiating a live game session between two users from within a message thread of a messaging application including the particular steps of the method of FIG. 13, this disclosure contemplates any suitable method for initiating the live game session between the two users from within the message thread including any suitable steps, which may include all, some, or none of the steps of the method of FIG. 13, where appropriate. Furthermore, although this disclosure describes and illustrates particular components, devices, or systems carrying out particular steps of the method of FIG. 13, this disclosure contemplates any suitable combination of any suitable components, devices, or systems carrying out any suitable steps of the method of FIG. 13. For example, the steps of the method 1300 may be performed by the messaging system 180 independently or by a combination of the messaging system 180 and the social-networking system 160.

Social Graph Affinity, Game Affinity, and Coefficients

In particular embodiments, the social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems, such as the messaging system 180 or the game managing system 190. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, the social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile interfaces, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, the social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, the social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, the social-networking system 160 may calculate a coefficient based on a user's actions. The social-networking system 160 may monitor such actions on the online social network, on a third-party system 170, on a messaging system 180, on a game-managing system 190, on other suitable systems, or any combination thereof. Any suitable type of user actions may be tracked or monitored. Typical user actions include viewing profile interfaces, creating or posting content, interacting with content, tagging or being tagged in images, joining groups, listing and confirming attendance at events, checking-in at locations, liking particular interfaces, creating interfaces, and performing other tasks that facilitate social action. In particular embodiments, the social-networking system 160 may calculate a coefficient based on the user's actions with particular types of content. The content may be associated with the online social network, a third-party system 170, an online messaging network associated with a messaging system 180, an online gaming network associated with a game-managing system 190, or another suitable system. The content may include users, profile interfaces, posts, news stories, headlines, instant messages, chat room conversations, emails, advertisements, pictures, video, music, other suitable objects, or any combination thereof. The social-networking system 160 may analyze a user's actions to determine whether one or more of the actions indicate an affinity for subject matter, content, other users, and so forth. As an example and not by way of limitation, if a user frequently posts content related to "coffee" or variants thereof, the social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile interface for the second user.

In particular embodiments, the social-networking system 160 may calculate a coefficient based on the type of relationship between particular objects. Referencing the social graph 166, the social-networking system 160 may analyze the number and/or type of edges 406 connecting particular user nodes 402 and concept nodes 404 when calculating a coefficient. As an example and not by way of limitation, user nodes 402 that are connected by a spouse-type edge (representing that the two users are married) may be assigned a higher coefficient than a user nodes 402 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, the social-networking system 160 may determine that the user has a higher coefficient with respect to the first photo than the second photo because having a tagged-in-type relationship with content may be assigned a higher weight and/or rating than having a like-type relationship with content. In particular embodiments, the social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, the social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 166. As an example and not by way of limitation, social-graph entities that are closer in the social graph 166 (i.e., fewer degrees of separation) may have a higher coefficient than entities that are further apart in the social graph 166.

In particular embodiments, the social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, the social-networking system 160 may determine that the user has a higher coefficient for the airport than the gas station based on the proximity of the airport to the user.

In particular embodiments, the social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, the social-networking system 160 may provide information that is relevant to user's interests and current circumstances, increasing the likelihood that they will find such information of interest. In particular embodiments, the social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, the social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results interface than results corresponding to objects having lower coefficients.

In particular embodiments, the social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, the social-networking system 160 may calculate the coefficient (or access the coefficient information if it has previously been calculated and stored). In particular embodiments, the social-networking system 160 may measure an affinity with respect to a particular process. Different processes (both internal and external to the online social network) may request a coefficient for a particular object or set of objects. The social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In connection with game affinity and analysis of the gamer graph, described above, particular embodiments may utilize one or more systems, components, elements, functions, methods, operations, or steps described in relation to social-graph affinity and affinity coefficients described above. In particular embodiments, the messaging system 180 (independently or in cooperation with the social-networking system 160) may determine the game affinity of various game-graph entities for each other. Game affinity may represent the strength of a relationship or level of interest between particular objects associated with the online gaming environment, such as users, games, and other objects associated with the online gaming environment, or any suitable combination thereof. Game affinity may also be determined with respect to objects associated with social-networking systems 160, third-party systems 170, game-managing systems 190, or other suitable systems. An overall game affinity for a game-graph entity for each user, game, or type of object may be established. The overall game affinity may change based on continued monitoring of the actions or relationships associated with the game-graph entity. Although this disclosure describes determining particular game affinities in a particular manner, this disclosure contemplates determining any suitable game affinities in any suitable manner.

Advertising

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more web interfaces, in one or more e-mails, or in connection with search results requested by a user. In addition or as an alternative, an advertisement may be one or more sponsored stories (e.g., a news-feed or ticker item on the social-networking system 160). A sponsored story may be a social action by a user (such as "liking" an interface, "liking" or commenting on a post on an interface, RSVPing to an event associated with an interface, voting on a question posted on an interface, checking in to a place, using an application or playing a game, or "liking" or sharing a website) that an advertiser promotes, for example, by having the social action presented within a pre-determined area of a profile interface of a user or other interface, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results interface, where sponsored content is promoted over non-sponsored content.

In particular embodiments, an advertisement may be requested for display within social-networking-system web interfaces, third-party web interfaces, or other interfaces. An advertisement may be displayed in a dedicated portion of an interface, such as in a banner area at the top of the interface, in a column at the side of the interface, in a GUI within the interface, in a pop-up window, in a drop-down menu, in an input field of the interface, over the top of content of the interface, or elsewhere with respect to the interface. In addition or as an alternative, an advertisement may be displayed within an application. An advertisement may be displayed within dedicated interfaces, requiring the user to interact with or watch the advertisement before the user may access an interface or utilize an application. The user may, for example view the advertisement through a web browser.

A user may interact with an advertisement in any suitable manner. The user may click or otherwise select the advertisement. By selecting the advertisement, the user may be directed to (or a browser or other application being used by the user) an interface associated with the advertisement. At the interface associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button").

Alternatively, by selecting the advertisement, the social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through the social-networking system 160) or RSVP (e.g., through the social-networking system 160) to an event associated with the advertisement. In addition or as an alternative, an advertisement may include social-networking-system content directed to the user. As an example and not by way of limitation, an advertisement may display information about a friend of the user within the social-networking system 160 who has taken an action associated with the subject matter of the advertisement.

Privacy

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile interface that identify a set of users that may access the work experience information on the user-profile interface, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 404 corresponding to a particular photo may have a privacy setting specifying that the photo may only be accessed by users tagged in the photo and their friends. In particular embodiments, privacy settings may allow users to opt in or opt out of having their actions logged by the social-networking system 160, the messaging system 180, or shared with other systems (e.g., a third-party system 170, game-managing system 190, etc.). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, the social-networking system 160 or the messaging system 180 may include authorization/privacy servers for enforcing privacy settings. In response to a request from a user (or other entity) for a particular object stored in a data store 164 or data store 184, the social-networking system 160/the messaging system 180 may send a request to the data store 164/data store 184 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164/data store 184, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Systems and Methods

Figure 14:
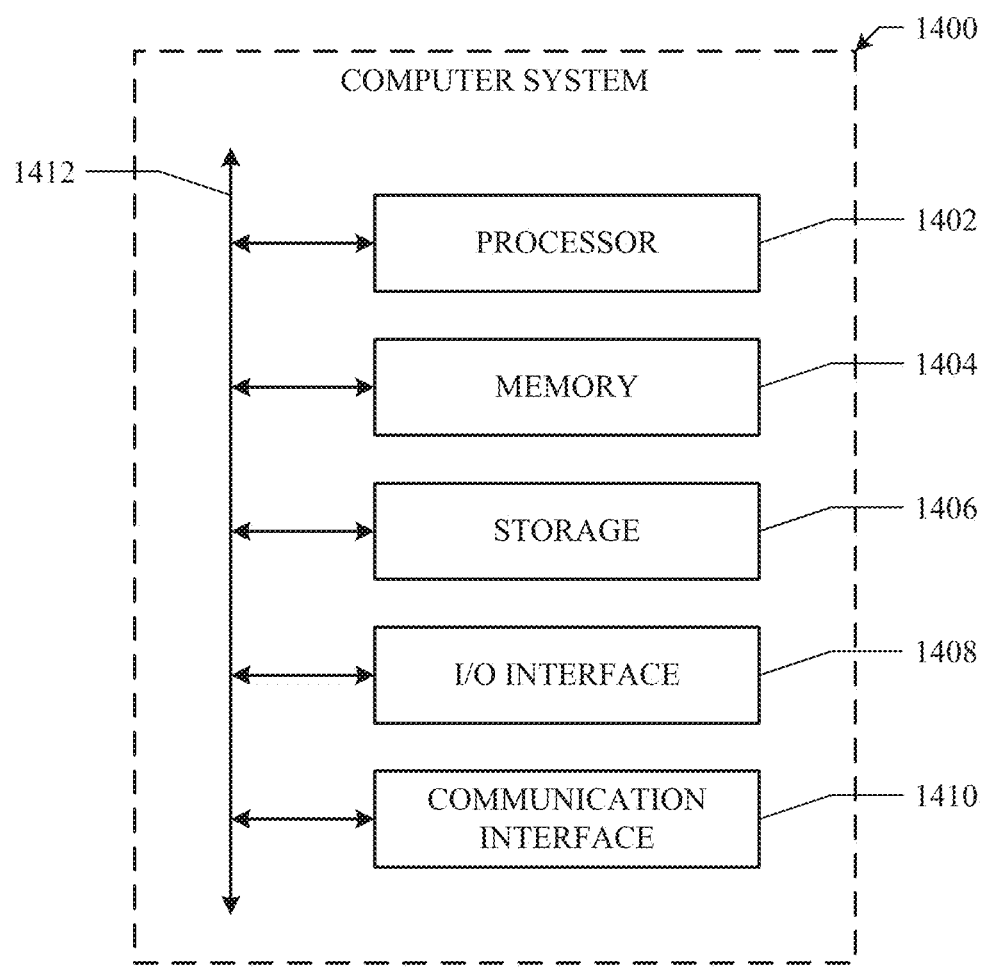
FIG. 14 illustrates an example computer system.

FIG. 14 illustrates an example computer system 1400. In particular embodiments, one or more computer systems 1400 perform one or more steps of one or more methods described or illustrated herein. In particular embodiments, one or more computer systems 1400 provide functionality described or illustrated herein. In particular embodiments, software running on one or more computer systems 1400 performs one or more steps of one or more methods described or illustrated herein or provides functionality described or illustrated herein. Particular embodiments include one or more portions of one or more computer systems 1400. Herein, reference to a computer system may encompass a computing device, and vice versa, where appropriate. Moreover, reference to a computer system may encompass one or more computer systems, where appropriate.

This disclosure contemplates any suitable number of computer systems 1400. This disclosure contemplates computer system 1400 taking any suitable physical form. As example and not by way of limitation, computer system 1400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1400 may include one or more computer systems 1400; be unitary or distributed; span multiple locations; span multiple machines; span multiple data centers; or reside in a cloud, which may include one or more cloud components in one or more networks. Where appropriate, one or more computer systems 1400 may perform without substantial spatial or temporal limitation one or more steps of one or more methods described or illustrated herein. As an example and not by way of limitation, one or more computer systems 1400 may perform in real time or in batch mode one or more steps of one or more methods described or illustrated herein. One or more computer systems 1400 may perform at different times or at different locations one or more steps of one or more methods described or illustrated herein, where appropriate.

In particular embodiments, computer system 1400 includes a processor 1402, memory 1404, storage 1406, an input/output (I/O) interface 1408, a communication interface 1410, and a bus 1412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1402 includes hardware for executing instructions, such as those making up a computer program. As an example and not by way of limitation, to execute instructions, processor 1402 may retrieve (or fetch) the instructions from an internal register, an internal cache, memory 1404, or storage 1406; decode and execute them; and then write one or more results to an internal register, an internal cache, memory 1404, or storage 1406. In particular embodiments, processor 1402 may include one or more internal caches for data, instructions, or addresses. This disclosure contemplates processor 1402 including any suitable number of any suitable internal caches, where appropriate. As an example and not by way of limitation, processor 1402 may include one or more instruction caches, one or more data caches, and one or more translation lookaside buffers (TLBs). Instructions in the instruction caches may be copies of instructions in memory 1404 or storage 1406, and the instruction caches may speed up retrieval of those instructions by processor 1402. Data in the data caches may be copies of data in memory 1404 or storage 1406 for instructions executing at processor 1402 to operate on; the results of previous instructions executed at processor 1402 for access by subsequent instructions executing at processor 1402 or for writing to memory 1404 or storage 1406; or other suitable data. The data caches may speed up read or write operations by processor 1402. The TLBs may speed up virtual-address translation for processor 1402. In particular embodiments, processor 1402 may include one or more internal registers for data, instructions, or addresses. This disclosure contemplates processor 1402 including any suitable number of any suitable internal registers, where appropriate. Where appropriate, processor 1402 may include one or more arithmetic logic units (ALUs); be a multi-core processor; or include one or more processors 1402. Although this disclosure describes and illustrates a particular processor, this disclosure contemplates any suitable processor.

In particular embodiments, memory 1404 includes main memory for storing instructions for processor 1402 to execute or data for processor 1402 to operate on. As an example and not by way of limitation, computer system 1400 may load instructions from storage 1406 or another source (such as, for example, another computer system 1400) to memory 1404. Processor 1402 may then load the instructions from memory 1404 to an internal register or internal cache. To execute the instructions, processor 1402 may retrieve the instructions from the internal register or internal cache and decode them. During or after execution of the instructions, processor 1402 may write one or more results (which may be intermediate or final results) to the internal register or internal cache. Processor 1402 may then write one or more of those results to memory 1404. In particular embodiments, processor 1402 executes only instructions in one or more internal registers or internal caches or in memory 1404 (as opposed to storage 1406 or elsewhere) and operates only on data in one or more internal registers or internal caches or in memory 1404 (as opposed to storage 1406 or elsewhere). One or more memory buses (which may each include an address bus and a data bus) may couple processor 1402 to memory 1404. Bus 1412 may include one or more memory buses, as described below. In particular embodiments, one or more memory management units (MMUs) reside between processor 1402 and memory 1404 and facilitate accesses to memory 1404 requested by processor 1402. In particular embodiments, memory 1404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1404 may include one or more memories 1404, where appropriate. Although this disclosure describes and illustrates particular memory, this disclosure contemplates any suitable memory.

In particular embodiments, storage 1406 includes mass storage for data or instructions. As an example and not by way of limitation, storage 1406 may include a hard disk drive (HDD), a floppy disk drive, flash memory, an optical disc, a magneto-optical disc, magnetic tape, or a Universal Serial Bus (USB) drive or a combination of two or more of these. Storage 1406 may include removable or non-removable (or fixed) media, where appropriate. Storage 1406 may be internal or external to computer system 1400, where appropriate. In particular embodiments, storage 1406 is non-volatile, solid-state memory. In particular embodiments, storage 1406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1406 taking any suitable physical form. Storage 1406 may include one or more storage control units facilitating communication between processor 1402 and storage 1406, where appropriate. Where appropriate, storage 1406 may include one or more storages 1406. Although this disclosure describes and illustrates particular storage, this disclosure contemplates any suitable storage.

In particular embodiments, I/O interface 1408 includes hardware, software, or both, providing one or more interfaces for communication between computer system 1400 and one or more I/O devices. Computer system 1400 may include one or more of these I/O devices, where appropriate. One or more of these I/O devices may enable communication between a person and computer system 1400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1408 for them. Where appropriate, I/O interface 1408 may include one or more device or software drivers enabling processor 1402 to drive one or more of these I/O devices. I/O interface 1408 may include one or more I/O interfaces 1408, where appropriate. Although this disclosure describes and illustrates a particular I/O interface, this disclosure contemplates any suitable I/O interface.

In particular embodiments, communication interface 1410 includes hardware, software, or both providing one or more interfaces for communication (such as, for example, packet-based communication) between computer system 1400 and one or more other computer systems 1400 or one or more networks. As an example and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1410 for it. As an example and not by way of limitation, computer system 1400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1400 may include any suitable communication interface 1410 for any of these networks, where appropriate. Communication interface 1410 may include one or more communication interfaces 1410, where appropriate. Although this disclosure describes and illustrates a particular communication interface, this disclosure contemplates any suitable communication interface.

In particular embodiments, bus 1412 includes hardware, software, or both coupling components of computer system 1400 to each other. As an example and not by way of limitation, bus 1412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1412 may include one or more buses 1412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

MISCELLANEOUS

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

The invention claimed is:
1. A method comprising:
receiving, at a first client system of a first user of a messaging network, a first notification that a second user has performed a first in-game action in a game session of a game;
displaying, at the first client system, a game window associated with the game within a message thread on a messaging application running on the first client system, wherein the game window comprises a live gameplay of the first in-game action and one or more interactive action buttons operable to allow the first user to perform one or more in-game actions;
receiving, by the first client system, an indication of the first user performing a second in-game action via the one or more interactive action buttons; and
sending, by the first client system to a second client system, a second notification that the first user has performed the second in-game action in the game session of the game.

2. The method of claim 1, wherein the first in-game action or the second in-game action comprises one of:
taking a turn or move in the game;
viewing a gameplay of the first user or the second user; or
sending a message to the first user or the second user.

3. The method of claim 1, wherein the first in-game action and the second in-game action are performed within an instance of the messaging application running on the first client system and the second client system, respectively.

4. The method of claim 1, wherein the game window displayed within the message thread further comprises one or more of:
a user progress indicator indicating current status of the first user and the second user with respect to the game;
a game status indicator indicating current status of the game; or
an action indicator indicating (1) a user who performed a last in-game action in the game session and (2) a user who has to perform a next in-game action in the game session.

5. The method of claim 1, further comprising:
receiving, by the first client system, an invite request for inviting one or more third users in the message thread;
sending, by the first client system to one or more third client systems of the one or more third users, the invite request;
receiving, from the one or more third client systems, an indication the one or more third users have accepted the invite request; and
sending, by the first client system to the one or more third client systems, one or more messages relating to the game.

6. The method of claim 5, wherein the invite request comprises one or more of:
an invite to view the game session of the first user and the second user from within the message thread; or
an invite to join the game session to play the game with the first and second users in the message thread.

7. The method of claim 1, wherein:
an anonymized context identifier (ID) is generated for the message thread comprising the first user and the second user;
the context ID is provided to a game bot associated with the game, the game bot being a software agent configured to act automatically on behalf of the game; and
the context ID is used by the game bot to interact with one or more of the first user or the second user associated with the message thread.

8. The method of claim 1, further comprising:
displaying, at the first client system, an interface of the messaging application comprising a games-tab element, wherein the games-tab element is selectable by the first user to access a games tab comprising a list of games;
selecting, by the first user via the games tab, the game from the list of games;
initiating, at the first client system, the game within the message thread on the messaging application;
selecting, by the first user, the second user from a plurality of users of the messaging network to play the game; and
sending, by the first client system to the second client system, an invite request inviting the second user to play the game with the first user,
wherein the first notification is received in response to the second user accepting the invite request and performing the first in-game action.

9. The method of claim 8, wherein the games tab is dynamically updated at periodic time intervals to (1) re-sort a current list of games and (2) incorporate game data associated with one or more games interacted with by the first user.

10. The method of claim 9, wherein the game data associated with the one or more games comprises at least the message thread associated with the game.

11. The method of claim 8, wherein the games-tab element is displayed in the interface of the messaging application in response to the first user satisfying a threshold level of gaming activity.

12. The method of claim 11, wherein the threshold level of gaming activity comprises one or more of:
the first user playing one or more games more than a threshold number of times within a predefined time period; or
the first user viewing gameplay of other users for the one or more games more than the threshold number of times within the predefined time period.

13. The method of claim 1, wherein the message thread comprises one or more of:
messages between the first user and the second user playing the game; or
messages between the first user and a game bot associated with the game.

14. The method of claim 1, wherein the message thread comprises one or more messages relating to the game.

15. The method of claim 14, wherein the one or more messages comprise one or more of:
performance metrics of the first user relative to the second user playing the game;
performance metrics of the second user;
game updates or releases from a game bot associated with the game; or
challenges or invites received from one or more third users to play the game.

16. The method of claim 1, wherein the one or more interactive action buttons contain metadata of one or more of the first user, the second user, or the game session.

17. The method of claim 16, wherein the metadata comprises information related to game status, a user who played last turn, user progress, and user rewards.

18. The method of claim 16, wherein the one or more interactive action buttons when interacted perform an action based on the metadata.

19. One or more computer-readable non-transitory storage media embodying software that is operable when executed to:
receive, at a first client system of a first user of a messaging network, a first notification that a second user has performed a first in-game action in a game session of a game;
display, at the first client system, a game window associated with the game within a message thread on a messaging application running on the first client system, wherein the game window comprises a live gameplay of the first in-game action and one or more interactive action buttons operable to allow the first user to perform one or more in-game actions;
receive, by the first client system, an indication of the first user performing a second in-game action via the one or more interactive action buttons; and
send, by the first client system to a second client system, a second notification that the first user has performed the second in-game action in the game session of the game.

20. A client system comprising: one or more processors; and a non-transitory memory coupled to the processors comprising instructions executable by the processors, the processors operable when executing the instructions to:
- receive, at the client system of a first user of a messaging network, a first notification that a second user has performed a first in-game action in a game session of a game;
- display a game window associated with the game within a message thread on a messaging application running on the first client system, wherein the game window comprises a live gameplay of the first in-game action and one or more interactive action buttons operable to allow the first user to perform one or more in-game actions;
- receive an indication of the first user performing a second in-game action via the one or more interactive action buttons; and
- send, to a second client system, a second notification that the first user has performed the second in-game action in the game session of the game.

* * * * *